US012712125B2

(12) United States Patent
Yasuda et al.

(10) Patent No.: US 12,712,125 B2
(45) Date of Patent: Aug. 18, 2026

(54) MULTILAYER CERAMIC CAPACITOR

(71) Applicant: Murata Manufacturing Co., Ltd., Nagaokakyo (JP)

(72) Inventors: Tatsunori Yasuda, Nagaokakyo (JP); Kouhei Semasa, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 218 days.

(21) Appl. No.: 18/760,093

(22) Filed: Jul. 1, 2024

(65) Prior Publication Data

US 2024/0355543 A1 Oct. 24, 2024

Related U.S. Application Data

(63) Continuation of application No. PCT/JP2023/020659, filed on Jun. 2, 2023.

(30) Foreign Application Priority Data

Jul. 14, 2022 (JP) ................................ 2022-113262

(51) Int. Cl.
*H01G 4/008* (2006.01)
*H01G 4/12* (2006.01)
(Continued)

(52) U.S. Cl.
CPC ......... *H01G 4/0085* (2013.01); *H01G 4/1227* (2013.01); *H01G 4/232* (2013.01); *H01G 4/252* (2013.01); *H01G 4/30* (2013.01)

(58) Field of Classification Search
CPC .... H01G 4/0085; H01G 4/1227; H01G 4/232; H01G 4/252; H01G 4/30
(Continued)

(56) References Cited

U.S. PATENT DOCUMENTS

2019/0318872 A1 10/2019 Mizuno
2020/0126729 A1* 4/2020 Mizukami ........... H01G 4/1209
(Continued)

FOREIGN PATENT DOCUMENTS

JP S62237714 A 10/1987
JP 2019186394 A 10/2019
(Continued)

OTHER PUBLICATIONS

International Search Report in PCT/JP2023/020659, mailed Aug. 1, 2023, 3 pages.

(Continued)

*Primary Examiner* — Arun Ramaswamy
(74) *Attorney, Agent, or Firm* — Keating & Bennett, LLP

(57) ABSTRACT

A multilayer ceramic capacitor includes a capacitor main portion including first, second, third, and fourth corner portions. The first insulating portion covers the first and second corner portions, and the second insulating portion covers the third and fourth corner portions. A roughness of the first corner portion is greater than a roughness of the first outer corner portion, a roughness of the second corner portion is greater than a roughness of the second outer corner portion, a roughness of the third corner portion is greater than a roughness of the third outer corner portion, and a roughness of the fourth corner portion is greater than a roughness of the fourth outer corner portion.

13 Claims, 10 Drawing Sheets

(51) Int. Cl.
*H01G 4/232* (2006.01)
*H01G 4/252* (2006.01)
*H01G 4/30* (2006.01)

(58) Field of Classification Search
USPC ..... 361/301.4, 311, 312, 321.1, 321.4, 321.5
See application file for complete search history.

(56) References Cited

U.S. PATENT DOCUMENTS

2020/0152390 A1* 5/2020 Yeon ...................... H01G 4/012
2021/0343478 A1 11/2021 Kojima
2022/0148813 A1* 5/2022 Lee ...................... H01G 4/1218
2022/0199325 A1 6/2022 Chikuma

FOREIGN PATENT DOCUMENTS

JP 2021174970 A 11/2021
JP 2022099069 A 7/2022

OTHER PUBLICATIONS

Written Opinion in PCT/JP2023/020659, mailed Aug. 1, 2023, 4 pages.

* cited by examiner

MULTILAYER CERAMIC CAPACITOR

CROSS REFERENCE TO RELATED APPLICATIONS

This application claims the benefit of priority to Japanese Patent Application No. 2022-113262, filed on Jul. 14, 2022, and is a Continuation application of PCT Application No. PCT/JP2023/020659, filed on Jun. 2, 2023. The entire contents of each application are hereby incorporated herein by reference.

BACKGROUND OF THE INVENTION

1. Field of the Invention

The present invention relates to multilayer ceramic electronic components, particularly to multilayer ceramic capacitors.

2. Description of the Related Art

In recent years, as electronic devices equipped with electronic components are further miniaturized, the dimensions of the electronic components are also decreased. As the dimensions of electronic components decrease, the overlapping area between the internal electrodes becomes smaller, posing a challenge to achieve miniaturization while increasing the capacity. A known method to address this issue involves exposing the internal electrode layers at the lateral surfaces, and subsequently affixing a dielectric multilayer sheet to the lateral surfaces of the chip to maximize the area of the internal electrodes in the lateral surface direction. Japanese Unexamined Patent Application, Publication No. S62-237714 discloses a technique related to the above.

However, electronic components manufactured in such a manner have had the potential issue of insufficient adhesion between the end of the insulating layer and the capacitor main portion, allowing moisture to infiltrate from the end of the insulating layer, and possibly reducing moisture resistance.

SUMMARY OF THE INVENTION

Example embodiment of the present invention provide multilayer ceramic capacitors that are each compact and have high-capacitance, yet are each able to reduce or prevent a decrease in moisture resistance.

An example embodiment of the present invention provides a multilayer ceramic capacitor including a capacitor main portion, a multilayer body, a first external electrode, and a second external electrode. The capacitor main portion includes a plurality of dielectric layers which are stacked, first and second main surfaces on opposite sides in a lamination direction, first and second main portion lateral surfaces on opposite sides in a width direction orthogonal or substantially orthogonal to the lamination direction, first and second end surfaces on opposite sides in a length direction orthogonal or substantially orthogonal to both the lamination direction and the width directions, a first internal electrode layer, stacked alternately with the plurality of dielectric layers, exposed at the first end surface and the first and second main portion lateral surfaces, and a second internal electrode layer, stacked alternately with the plurality of dielectric layers, exposed at the second end surface and the first and second main portion lateral surfaces. The multilayer body includes a first insulating portion provided on the first main portion lateral surface of the capacitor main portion, and a second insulating portion provided on the second main portion lateral surface of the capacitor main portion. The first external electrode is provided to wrap around from the first end surface to the first main surface, the second main surface, the surface of the first insulating portion, and the surface of the second insulating portion. The second external electrode is provided to wrap around from the second end surface to the first main surface, the second main surface, the surface of the first insulating portion, and the surface of the second insulating portion. The capacitor main portion further includes a first corner portion curving across the first main surface and the first main portion lateral surface, a second corner portion curving across the second main surface and the first main portion lateral surface, a third corner portion curving across the first main surface and the second main portion lateral surface, and a fourth corner portion curving across the second main surface and the second main portion lateral surface. The first insulating portion covers the first and second corner portions. The second insulating portion covers the third and fourth corner portions. A surface opposing the surface contacting the first main portion lateral surface in the first insulating portion is defined as a first lateral surface of the multilayer body. A surface opposing the surface contacting the second main portion lateral surface in the second insulating portion is defined as a second lateral surface of the multilayer body. The first insulating portion includes a first outer corner portion where the first main surface and the first lateral surface intersect, and a second outer corner portion where the second main surface and the first lateral surface intersect. The second insulating portion includes a third outer corner portion where the first main surface and the second lateral surface intersect, and a fourth outer corner portion where the second main surface and the second lateral surface intersect. The roughness of the first corner portion is greater than the roughness of the first outer corner portion. The roughness of the second corner portion is greater than the roughness of the second outer corner portion. The roughness of the third corner portion is greater than the roughness of the third outer corner portion. The roughness of the fourth corner portion is greater than the roughness of the fourth outer corner portion.

Example embodiments of the present invention provide multilayer ceramic capacitors that are each compact and have high-capacitance, yet are each able to reduce or prevent a decrease in moisture resistance.

The above and other elements, features, steps, characteristics and advantages of the present invention will become more apparent from the following detailed description of the example embodiments with reference to the attached drawings.

BRIEF DESCRIPTION OF THE DRAWINGS

FIG. 2 is a perspective view of the multilayer body according to an example embodiment of the present invention.

FIG. 7 is a diagram corresponding to the cross-sectional view along the line III-III in FIG. 2, in another example embodiment of the present invention.

DETAILED DESCRIPTION OF THE EXAMPLE EMBODIMENTS

Figure 1:
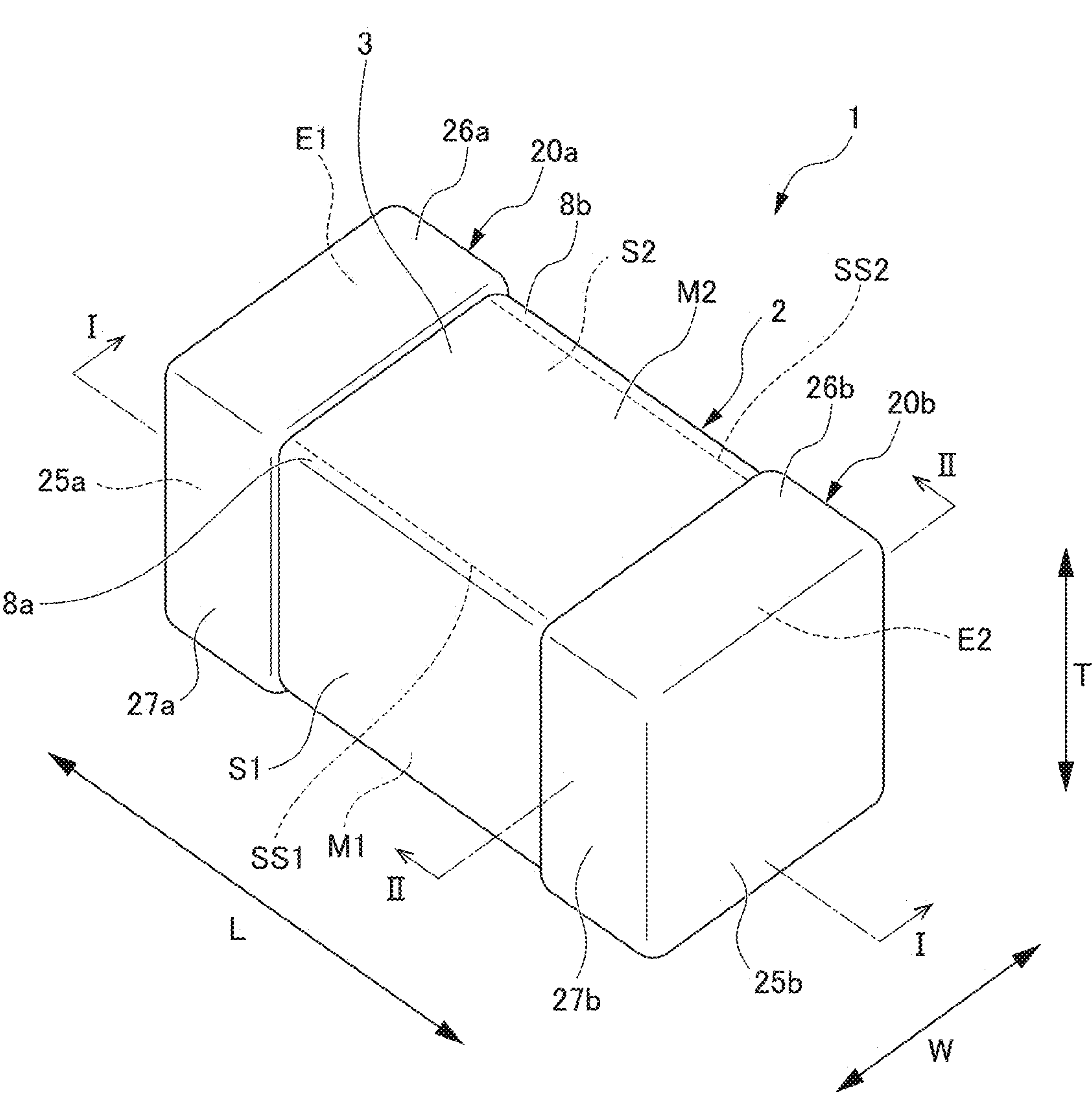
FIG. 1 is a perspective view of a multilayer ceramic capacitor according to an example embodiment of the present invention.

Hereinafter, examples of example embodiments of the present invention will be described with reference to the accompanying drawings. In the following description, a multilayer ceramic capacitor will be described as an example of multilayer ceramic electronic components. The same or corresponding portions in each drawing are designated with the same reference numerals.

External Configuration of Multilayer Ceramic Capacitor

Based on FIG. 1, an overview of the appearance of a multilayer ceramic capacitor 1 will be described. FIG. 1 is a perspective view illustrating the multilayer ceramic capacitor 1 of the present example embodiment. The multilayer ceramic capacitor 1 includes a multilayer body 2 and external electrodes 20. The external electrodes 20 include a first external electrode 20*a* and a second external electrode 20*b*.

Definition of Directions

Figure 2:
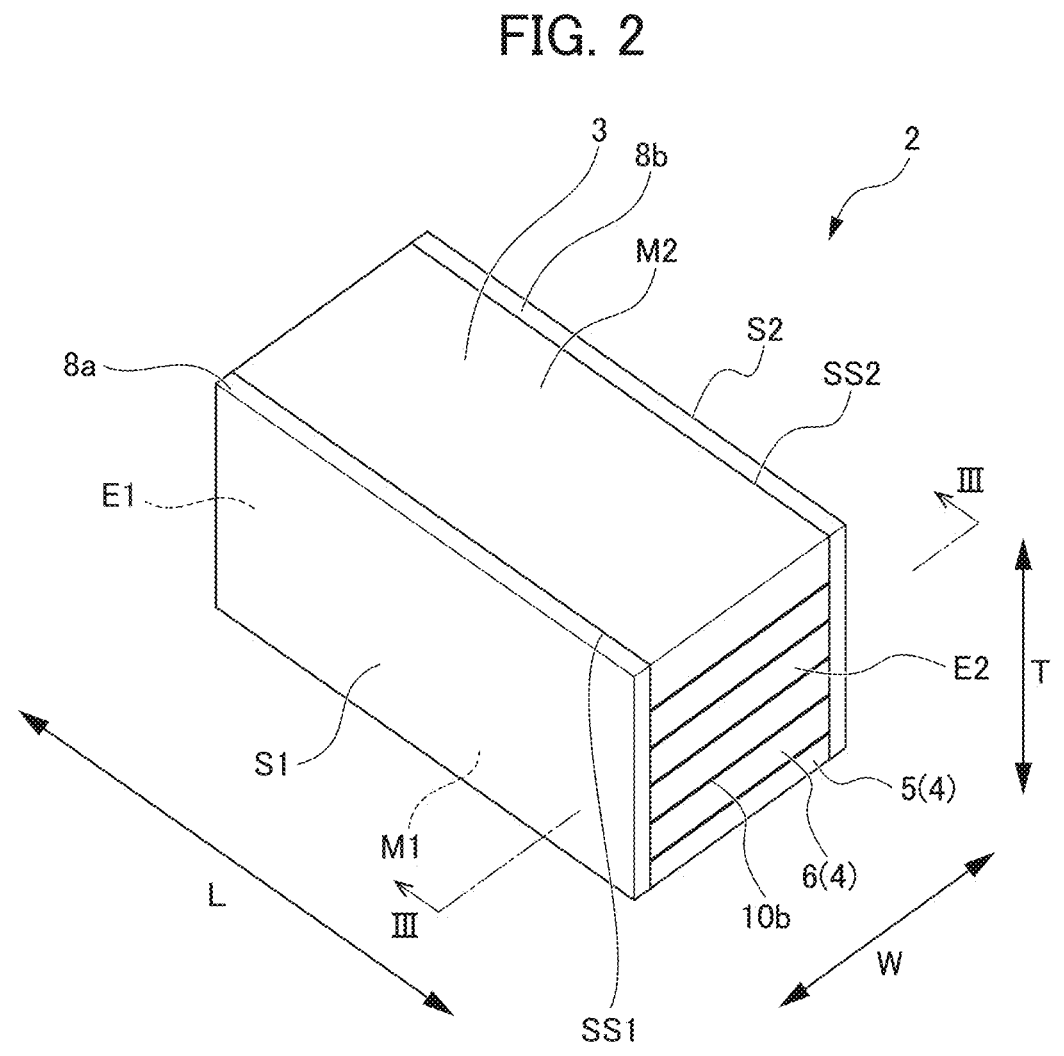
Figure 3:
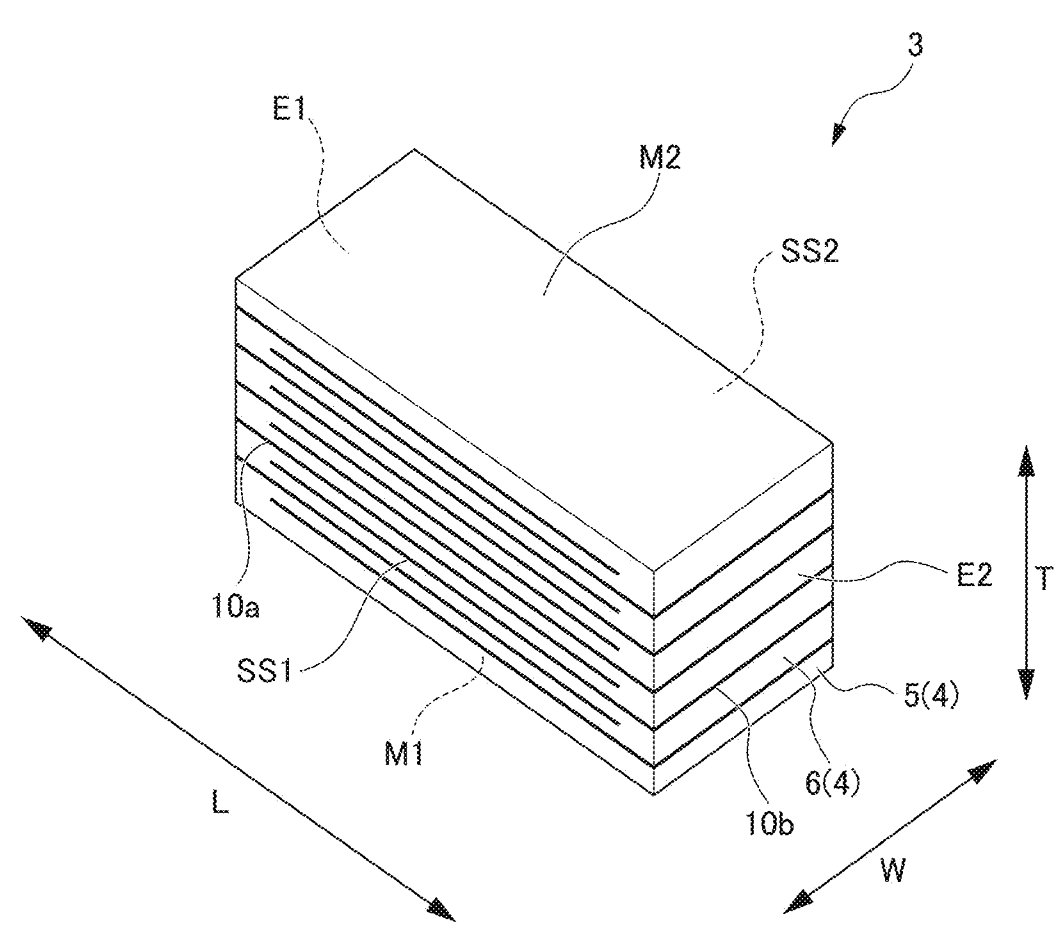
FIG. 3 is a perspective view of a capacitor main portion according to an example embodiment of the present invention.
Figure 4:
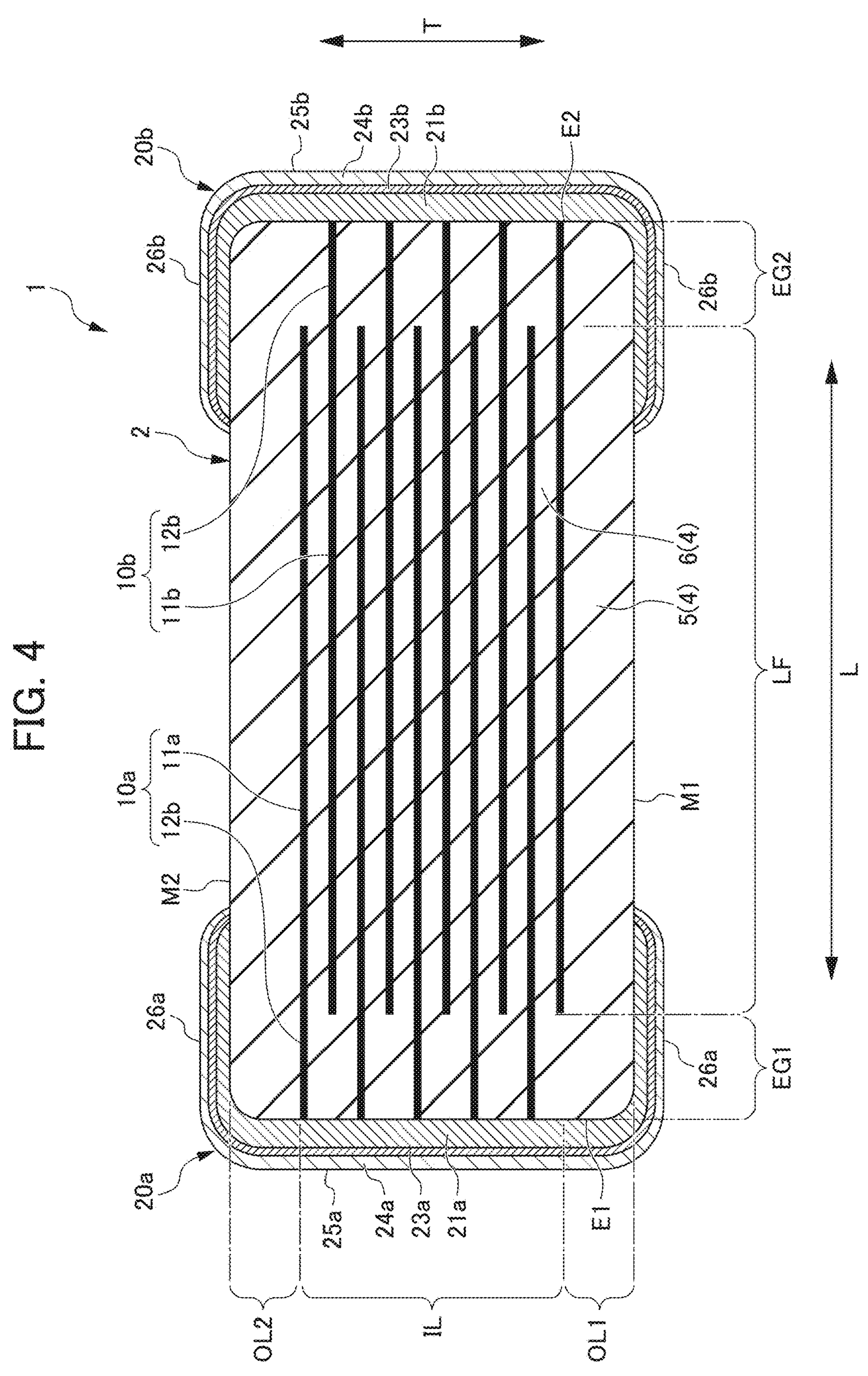
FIG. 4 is a cross-sectional view along the line I-I in FIG. 1.
Figure 5:
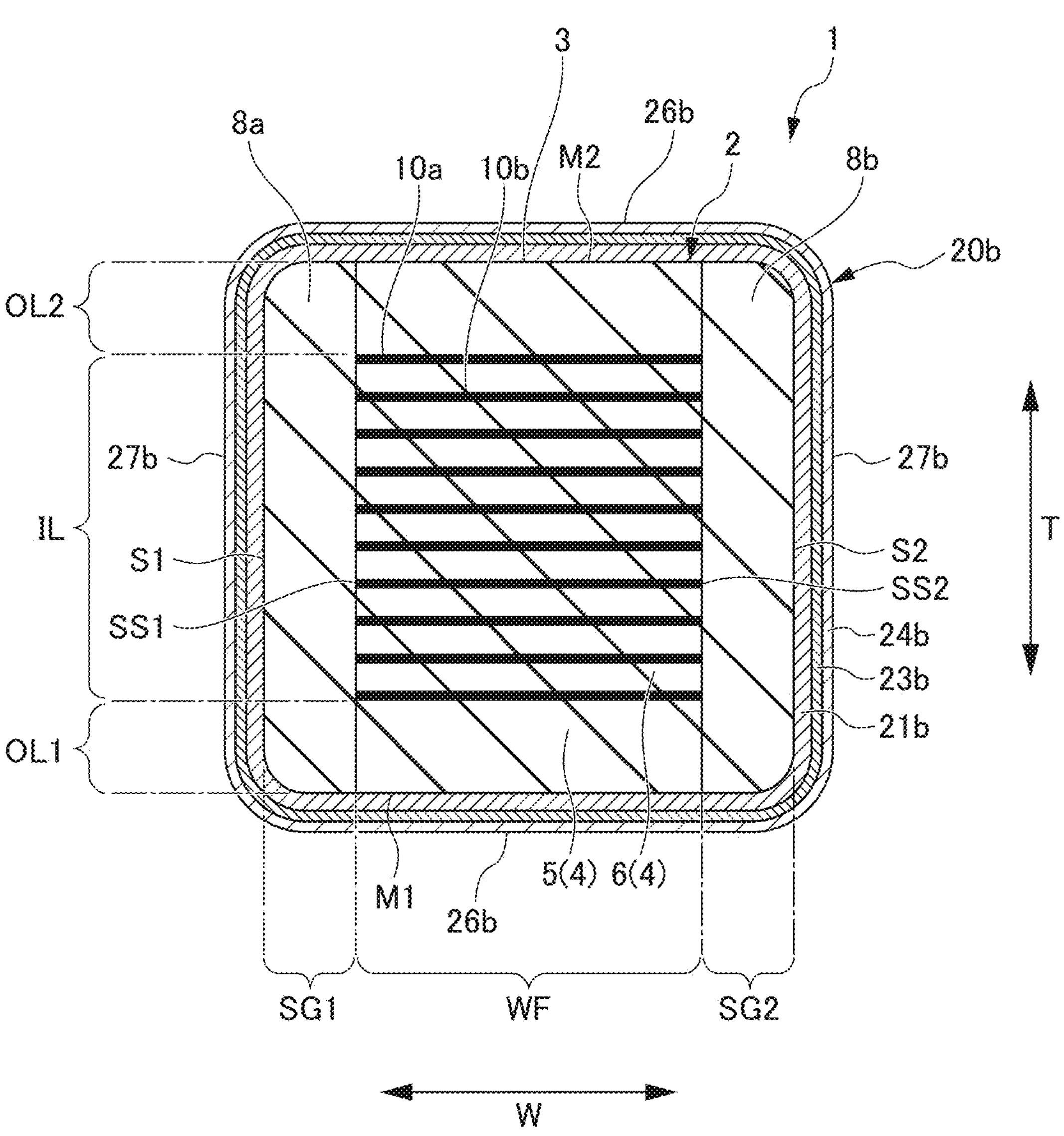
FIG. 5 is a cross-sectional view along the line II-II in FIG. 1.

FIGS. 1 to 7 illustrate an L direction, W direction, and T direction. The L direction is the length direction L of the multilayer ceramic capacitor 1. The W direction is the width direction W of the multilayer ceramic capacitor 1. The T direction is the lamination direction T of the multilayer ceramic capacitor 1. Accordingly, the cross-section illustrated in FIG. 4 is referred to as an LT cross-section, and the cross-section illustrated in FIG. 5 is referred to as a WT cross-section. The length direction L, width direction W, and lamination direction T do not necessarily have to be orthogonal or substantially orthogonal to each other. The length direction L, width direction W, and lamination direction T may intersect each other.

External Shape of Multilayer Body

As illustrated in FIG. 1, the multilayer body 2 has a rectangular or substantially rectangular parallelepiped shape. The multilayer body 2 includes two main surfaces M, two end surfaces E, and two lateral surfaces S. The main surfaces M are provided on opposite sides in the lamination direction T. The end surfaces E are provided on opposite sides in the length direction L. The lateral surfaces S are provided on opposite sides in the width direction W. The two main surfaces M include a first main surface M1 and a second main surface M2. The two end surfaces E include a first end surface E1 and a second end surface E2. The two lateral surfaces S include a first lateral surface S1 and a second lateral surface S2.

The corner portions of the multilayer body 2 are preferably rounded. The corner portions refer to the portions where at least two surfaces of the multilayer body 2 intersect. Furthermore, irregularities or the like may be formed on the surfaces of some or all of the two main surfaces M, the two end surfaces E, and the two lateral surfaces S. The size of the multilayer body 2 is not particularly limited.

Capacitor Main Portion

The configuration of the multilayer body 2 will be described based on FIGS. 2 and 3. FIG. 2 is a perspective view of the multilayer body 2 according to an example embodiment of the present invention. FIG. 3 is a perspective view of the capacitor main portion 3 according to an example embodiment of the present invention. The multilayer body 2 includes the capacitor main portion 3 and two insulating portions 8. One of the two insulating portions 8 is a first insulating portion 8*a*, and the other is a second insulating portion 8*b*. The capacitor main portion 3 includes a plurality of dielectric layers 4 and a plurality of internal electrode layers 10. The plurality of dielectric layers 4 and the plurality of internal electrode layers 10 are stacked in the lamination direction T. The internal electrode layers 10 include a first internal electrode layer 10*a* and a second internal electrode layer 10*b*. Details of the internal electrode layers 10 will be described later.

In the capacitor main portion 3, the two surfaces on opposite sides in the width direction W are referred to as main portion lateral surfaces SS. Specifically, as illustrated in FIG. 3, among the two main portion lateral surfaces SS, one is referred to as a first main portion lateral surface SS1, and the other as a second main portion lateral surface SS2. The insulating portions 8 are provided on the two main portion lateral surfaces SS, respectively, of the capacitor main portion 3, thus forming the multilayer body 2. Specifically, the first insulating portion 8*a* is provided on the first main portion lateral surface SS1, and the second insulating portion 8*b* is provided on the second main portion lateral surface SS2.

Insulating Portions

The insulating portions 8 are members provided on the two main portion lateral surfaces SS of the capacitor main portion 3. The insulating portions 8 have a sheet shape. The material defining the insulating portions 8 is not particularly limited, as long as the material includes insulating properties. The primary component of the material of the insulating portions 8 may be the same as or similar to the material defining the dielectric layers 4. Alternatively, the material defining the insulating portions 8 may be a resin component.

Surfaces of Multilayer Body and Capacitor Main Portion

As described above, the insulating portions 8 are provided on the two main portion lateral surfaces SS, respectively, of the capacitor main portion 3, thus configuring the multilayer body 2. Therefore, the end surfaces E of the multilayer body 2 are the same as the end surfaces E of the capacitor main portion 3. Similarly, the main surfaces M of the multilayer body 2 are the same as the main surfaces M of the capacitor main portion 3. Conversely, the lateral surfaces S of the multilayer body 2 are the surfaces of the insulating portions 8 provided on the main portion lateral surfaces SS of the capacitor main portion 3. Specifically, the surface of the first insulating portion 8*a* opposing the first main portion lateral surface SS1 is the first lateral surface S1 of the multilayer body 2. Similarly, the surface of the second insulating portion 8*b* opposing the second main portion lateral surface SS2 is the second lateral surface S2 of the multilayer body 2.

The internal electrode layers 10 are exposed at the two main portion lateral surfaces SS and the two end surfaces E of the capacitor main portion 3. Specifically, the first internal electrode layer 10*a* is exposed at the first end surface E1 of the capacitor main portion 3, and the second internal electrode layer 10*b* is exposed at the second end surface E2 of the capacitor main portion 3. The first internal electrode layer 10*a* and the second internal electrode layer 10*b* are exposed at the first main portion lateral surface SS1 and the second main portion lateral surface SS2 of the capacitor main portion 3. The first insulating portion 8*a* is provided on the first main portion lateral surface SS1, and the second insulating portion 8*b* is provided on the second main portion lateral surface SS2, thus externally insulating the first electrode layer 10*a* and the second internal electrode layer 10*b*, which are exposed at the first main portion lateral surface SS1 and the second main portion lateral surface SS2. The first electrode layer 10*a* and the second internal electrode layer 10*b* can also be not exposed at the first main portion lateral surface SS1 and the second main portion lateral surface SS2. That is, the first electrode layer 10*a* and the second internal electrode layer 10*b* may be covered by the dielectric layers 4, on the first main portion lateral surface SS1 and the second main portion lateral surface SS2. The specific configuration of the capacitor main portion 3 will be described with reference to FIGS. 4 and 5.

Internal Structure (LT Cross-Section) of Multilayer Body

Based on FIG. 4, the internal structure of the multilayer body 2 will be described. FIG. 4 is a cross-sectional view along the line I-I of the multilayer ceramic capacitor illustrated in FIG. 1. The cross-section of portion of the multilayer body 2 illustrated in FIG. 4 corresponds to the LT cross-section of the corresponding portion of the capacitor main portion 3. As illustrated in FIG. 4, the multilayer body 2 includes the plurality of dielectric layers 4 and the plurality of internal electrode layers 10. The plurality of dielectric layers 4 and the plurality of internal electrode layers 10 are stacked in the lamination direction T.

Inner Layer Portions and Outer Layer Portions

The multilayer body 2 includes an inner layer portion IL and two outer layer portions OL in the lamination direction T. The outer layer portions OL include a first outer layer portion OL1 and a second outer layer portion OL2. The first outer layer portion OL1 and the second outer layer portion OL2 are provided to sandwich the inner layer portion IL.

The inner layer portion IL includes a portion of the plurality of dielectric layers 4 and the plurality of internal electrode layers 10. In the inner layer portion IL, the plurality of internal electrode layers 10 are provided to oppose each other across the dielectric layers 4. The inner layer portion IL forms capacitance and substantially defines and functions as a capacitor. Thus, the inner layer portion IL is also referred to as an effective portion.

The first outer layer portion OL1 is provided on the side of the first main surface M1 of the multilayer body 2, and the second outer layer portion OL2 is provided on the side of the second main surface M2 of the multilayer body 2. Specifically, the first outer layer portion OL1 is provided between the internal electrode layer 10, which is closest to the first main surface M1 among the plurality of internal electrode layers 10, and the first main surface M1. The second outer layer portion OL2 is provided between the internal electrode layer 10, which is closest to the second main surface M2 among the plurality of internal electrode layers 10, and the second main surface M2. The first outer layer portion OL1 and the second outer layer portion OL2 do not include the internal electrode layers 10, but include the dielectric layers 4, excluding the dielectric layers 4 for the inner layer portion IL, among the plurality of dielectric layers 4. The first outer layer portion OL1 and the second outer layer portion OL2 function as protective layers for the inner layer portion IL.

Dielectric Layers

The dielectric layers 4 include outer dielectric layers 5 and inner dielectric layers 6.

Outer Dielectric Layers

Among the dielectric layers 4, the outer dielectric layers 5 are the dielectric layers 4 defining the first outer layer portion OL1 and the second outer layer portion OL2. The outer dielectric layers 5 are provided between the first main surface M1 and the internal electrode layer 10 closest to the first main surface M1, and between the second main surface M2 and the internal electrode layer 10 closest to the second main surface M2.

Inner Dielectric Layers

The inner dielectric layers 6 are the dielectric layers 4 provided between the internal electrode layers 10, and constitute the inner layer portion IL together with the internal electrode layers 10. The inner dielectric layers 6 are provided between the first internal electrode layer 10*a* and the second internal electrode layer 10*b*, which will be described below.

Number of Dielectric Layers

The number of the dielectric layers 4 stacked in the multilayer body 2 can preferably be, for example, between 5 and 2000 layers inclusive. The number of the dielectric layers 4 includes the number of both the outer dielectric layers 5 and the inner dielectric layers 6.

Material of Dielectric Layers

The material of the dielectric layers 4 can preferably include, for example, dielectric ceramics composed mainly of materials such as $BaTiO_3$, $CaTiO_3$, $SrTiO_3$, $CaZrO_3$, etc. Additives such as, for example, Mn compounds, Fe compounds, Cr compounds, Co compounds, Ni compounds, etc., can also be added to these main components.

The dielectric layers 4 can include a plurality of crystal grains including perovskite compounds based on $BaTiO_3$ as the basic structure, for example. Here, the thinner the dielectric layer 4, the greater the capacitance of the capacitor. Therefore, the crystal grain size is, for example, preferably about 1 μm or less. As the thickness of the dielectric layer decreases, the crystal grains become smaller, but if the crystal grains become too small, the relative permittivity may be reduced due to the size effect. Therefore, the size of the crystal grains is appropriately designed based on the thickness of the dielectric layer.

If piezoelectric ceramics are used for the multilayer body 2, the multilayer ceramic electronic component will define and function as a ceramic piezoelectric element. Examples of piezoelectric ceramic materials include, for instance, PZT (piezoelectric zirconate titanate)-based ceramic materials.

If semiconductor ceramics are used for the multilayer body 2, the multilayer ceramic electronic component will define and function as a thermistor element. Examples of semiconductor ceramic materials may include, for instance, spinel-based ceramic materials.

If ferrite ceramics are used for the multilayer body, the multilayer ceramic electronic component will define and function as an inductor element. In cases where the multilayer ceramic electronic component functions as an inductor element, the internal electrode layers serve as coil-shaped conductors. Examples of ferrite ceramic materials may include, for instance, ferrite ceramic materials.

Thickness of Dielectric Layers

The thickness of the dielectric layer 4 can preferably be, for example, between about 0.3 μm and about 100 μm inclusive. The outer dielectric layer 5 may be a plurality of layers or a single layer.

Internal Electrode Layers

The internal electrode layers 10 include a first internal electrode layer 10*a* and a second internal electrode layer 10*b*. The first internal electrode layer 10*a* is the internal electrode layer 10 connected to the first external electrode 20*a*. The second internal electrode layer 10*b* is the internal electrode layer 10 connected to the second external electrode 20*b*. The external electrodes 20 will be described later. The first internal electrode layer 10*a* extends from the first end surface E1 toward the second end surface E2. The second internal electrode layer 10*b* extends from the second end surface E2 toward the first end surface E1.

Counter Portion and Extension Portion

Each of the first internal electrode layer 10*a* and the second internal electrode layer 10*b* includes a counter electrode portion 11 and an extension electrode portion 12. The counter electrode portion 11 is the portion of the internal electrode layer 10 in which the first internal electrode layer 10*a* and the second internal electrode layer 10*b* oppose each other in the lamination direction T. The extension electrode portion 12 of the internal electrode layer 10 extends from the counter electrode portion 11 to either of the end surface E1 or E2 of the multilayer body 2.

The counter electrode portion 11 of the first internal electrode layer 10*a* is referred to as the first counter electrode portion 11*a*, and the extension electrode portion 12 of the first internal electrode layer 10*a* is referred to as the first extension electrode portion 12*a*. The first extension electrode portion 12*a* extends from the first counter electrode portion 11*a* to the first end surface E1 of the multilayer body 2. Similarly, the counter electrode portion 11 of the second internal electrode layer 10*b* is referred to as the second counter electrode portion 11*b*, and the extension electrode portion 12 of the second internal electrode layer 10*b* is referred to as the second extension electrode portion 12*b*. The second extension electrode portion 12*b* extends from the second counter electrode portion 11*b* to the second end surface E2 of the multilayer body 2.

Number of Internal Electrode Layers

The number of the internal electrode layers 10 can preferably be, for example, between 10 and 2000 layers inclusive. The number of the internal electrode layers 10 includes the number of both the first internal electrode layers 10*a* and the second internal electrode layers 10*b*.

Thickness of Internal Electrode Layers

The thickness of the internal electrode layers 10 can preferably be, for example, between about 0.1 μm and about 5.0 μm inclusive, and preferably between about 0.2 μm and about 2.0 μm inclusive. When the thickness of the internal electrode layers 10 is about 0.5 μm or more, a plating film can be formed more easily when forming the metal layer of the external electrodes 20 by plating. The metal layer will be described later.

Material of Internal Electrode Layers

The material of the internal electrode layers 10 can include metals such as, for example, Ni, Cu, Ag, Pd, and Au, or alloys of Ni and Cu, alloys of Ag and Pd, etc. The material of the internal electrode layers 10 may additionally include dielectric particles of the same compositional system as the ceramics included in the dielectric layer 4.

Electrode Counter Portion

The segments of the multilayer body 2 in the length direction L will be described. The multilayer body 2 includes an electrode counter portion LF and two end gap portions EG in the length direction L. The end gap portions EG include a first end gap portion EG1 and a second end gap portion EG2. The electrode counter portion LF is the portion where the first internal electrode layer 10*a* and the second internal electrode layer 10*b* oppose each other in the lamination direction T. In the electrode counter portion LF, the first counter electrode portion 11*a* and the second counter electrode portion 11*b* oppose each other in the lamination direction T. The electrode counter portion LF is provided in the central portion of the multilayer body 2 in the length direction L. The first counter electrode portion 11*a* and the second counter electrode portion 11*b* oppose each other across the inner dielectric layer 6, thus generating capacitance. Hence, the electrode counter portion LF is also referred to as the effective portion.

End Gap Portions

The end gap portion is the portion where the first internal electrode layer 10*a* and the second internal electrode layer 10*b* do not oppose each other in the lamination direction T. Specifically, the first end gap portion EG1 is the portion where the first internal electrode layer 10*a* is provided, but the second internal electrode layer 10*b* is not provided in the lamination direction T. Similarly, the second end gap portion EG2 is the portion where the second internal electrode layer 10*b* is provided, but the first internal electrode layer 10*a* is not provided.

The first end gap portion EG1 corresponds to the portion where the first extension electrode portion 12*a* is provided, and the second end gap portion EG2 corresponds to the portion where the second extension electrode portion 12*b* is provided. The first end gap portion EG1 functions as the extension electrode to the first end surface E1 of the first internal electrode layer 10*a*, and the second end gap portion EG2 functions as the extension electrode to the second end surface E2 of the second internal electrode layer 10*b*. The end gap portions EG are segments in the length direction L, and thus also referred to as L gaps.

The length of the end gap portion EG in the length direction L can preferably be, for example, between about 5 μm and about 30 μm inclusive.

The specific configuration of the internal electrode layer 10, etc., can be variously modified. For example, while the shape of the first counter electrode portion 11*a* of the first internal electrode layer 10*a* is not particularly limited, a rectangular shape is preferred. However, the corner portions may be rounded or formed diagonally. That is, the corner portions may be tapered. The shape may be tapered, sloping toward any one of the edges of the first counter electrode portion 11*a*.

Similarly, the shape of the second counter electrode portion 11*b* of the second internal electrode layer 10*b* is not particularly limited, but a rectangular shape is preferred. However, the corner portions may be rounded or formed diagonally. That is, the corner portions may be tapered. The shape may be tapered, sloping toward any one of the edges of the second counter electrode portion 11*b*.

Similarly, the shape of the first extension electrode portion 12*a* of the first internal electrode layer 10*a* is not particularly limited, but a rectangular shape is preferred. However, the corner portions may be rounded or formed diagonally. That is, the corner portions may be tapered. The shape may be tapered, sloping toward any one of the edges of the first extension electrode portion 12*a*.

Similarly, the shape of the second extension electrode portion 12*b* of the second internal electrode layer 10*b* is not particularly limited, but a rectangular shape is preferred. However, the corner portions may be rounded or formed diagonally. That is, the corner portions may be tapered. The shape may be tapered, sloping toward any one of the edges of the second extension electrode portion 12*b*.

The width of the first counter electrode portion 11*a* of the first internal electrode layer 10*a* and the width of the first extension electrode portion 12*a* of the first internal electrode layer 10*a* may be the same, or one of them may be narrower than the other.

The width of the second counter electrode portion 11*b* of the second internal electrode layer 10*b* and the width of the second extension electrode portion 12*b* of the second internal electrode layer 10*b* may be the same, or one of them may be narrower than the other.

The first extension electrode portion 12*a* of the first internal electrode layer 10*a* may curve toward the center of the first end surface E1 of the multilayer body 2.

The second extension electrode portion 12*b* of the second internal electrode layer 10*b* may curve toward the center of the second end surface E2 of the multilayer body 2.

Among the internal electrode layers 10 extending to each end surface E, the distance between the internal electrode layer 10 closest to the first main surface M1 and the internal electrode layer 10 closest to the second main surface M2 may be shorter than the distance between the counter electrode portions 11 closest to the first main surface M1 and the counter electrode portions 11 closest to the second main surface M2.

In the present example embodiment of the multilayer ceramic capacitor 1, the counter electrode portions 11 of the internal electrode layers 10 oppose each other across the dielectric layer 4, thus generating capacitance, and manifesting capacitor characteristics. To achieve high capacitance of the capacitor, the surface area of the internal electrode layers 10 needs to be increased. Therefore, the coverage of the LW surface of the internal electrode layers 10 is preferably 90% or more. When the internal electrode layer 10 is viewed from the LW surface, the coverage of the LW surface is defined as the percentage of the remaining area after subtracting the area of the voids from the area inside the edges of the internal electrode layer 10.

Higher coverage of the LW surface results in higher capacitance of the capacitor. When the LW surface coverage is low, the dielectric layers 4 are joined through voids, leading to higher bonding strength between layers, and making delamination less likely.

The internal electrode layers 10 are preferably uniform in thickness, but the thickness at the edges in the width direction W may be greater than the thickness at the center.

Step Layer

A step layer may be provided in the L gap, i.e., the end gap portion EG. The step layer is an additional dielectric layer 4 provided to the end gap portion EG to minimize the difference in length between the end gap portion EG and the electrode counter portion LF in the lamination direction T. The step layer may be provided such that the internal electrode layers 10 cover a portion of the step layer. Conversely, the step layer may be provided to cover a portion of the internal electrode layers 10. The thickness of the step layer is preferably similar to the thickness of the internal electrode layers 10. The step layer preferably includes components similar to that of the dielectric layer 4. However, the components of the dielectric layer 4 are not limited thereto.

Dummy Electrode Layer

A dummy electrode layer may be provided in the L gap. The dummy electrode layer can be provided in at least one of the inner layer portion IL and the outer layer portions OL. Here, the outer layer portions OL include the first outer layer portion OL1 and the second outer layer portion OL2. When provided in the outer layer portions OL, the dummy electrode layer is preferably provided on a portion shifted in parallel from the L gap in the lamination direction T. That is, the dummy electrode layer is preferably provided at the position corresponding to the L gap of the outer layer portion OL in the length direction L.

The dummy electrode layer may include a first dummy electrode layer and a second dummy electrode layer. The thickness of the first dummy electrode layer is preferably similar to the total thickness of the first internal electrode layers 10*a*. That is, the thickness of the first dummy electrode layer is preferably similar to the thickness obtained by multiplying the first internal electrode layer 10*a* by the number of the first internal electrode layers 10*a*. The first dummy electrode layer may be a single layer or a plurality of layers, as long as the thickness of the first dummy electrode layer is similar to the total thickness of the first internal electrode layer 10*a*.

The second dummy electrode layer is similar to the first dummy electrode layer. That is, the thickness of the second dummy electrode layer is preferably similar to the total thickness of the second internal electrode layers 10*b*. That is, the thickness of the second dummy electrode layer is preferably similar to the thickness obtained by multiplying the thickness of the second internal electrode layers 10*b* by the number of the second internal electrode layers 10*b*. The second dummy electrode layer may be a single layer or a plurality of layers, as long as the thickness thereof is similar to the total thickness of the second internal electrode layers 10*b*.

External Electrodes

The external electrodes 20 include the first external electrode 20*a* and the second external electrode 20*b*.

First External Electrode

The first external electrode 20*a* is the external electrode 20 provided on the first end surface E1 of the multilayer body 2. The first external electrode 20*a* is electrically connected to the first internal electrode layer 10*a*.

Second External Electrode

The second external electrode 20*b* is the external electrode 20 provided on the second end surface E2 of the multilayer body 2. The second external electrode 20*b* is electrically connected to the second internal electrode layer 10*b*.

External Electrode on Each Surface

The external electrodes 20 extend from the end surfaces E to portion of the two main surfaces M and portion of the two lateral surfaces S. The portions of the external electrode 20 provided on the end surfaces E are referred to as the end surface external electrodes 25. The portions of the external electrode 20 provided on a portion of the main surfaces M are referred to as the main surface external electrodes 26. The portions of the external electrode 20 provided on portion of the lateral surfaces S are referred to as the lateral surface external electrodes 27.

Specifically, the portion of the first external electrode 20*a* provided on the first end surface E1 is referred to as a first end surface external electrode 25*a*. The portion of the first external electrode 20*a* provided on a portion of the first main surface M1 or portion of the second main surface M2 is referred to as a first main surface external electrode 26*a*. The portion of the first external electrode 20*a* provided on portion of the first lateral surface S1 or portion of the second lateral surface S2 is referred to as a first lateral surface external electrode 27*a*.

As for the second external electrode 20*b*, similarly to the first external electrode 20*a*, the portion of the second external electrode 20*b* provided on the second end surface E2 is referred to as the second end surface external electrode 25*b*. The portion of the second external electrode 20*b* provided on portion of the first main surface M1 or portion of the second main surface M2 is referred to as a second main surface external electrode 26*b*. The portion of the second external electrode 20*b* provided on portion of the first lateral surface S1 or portion of the second lateral surface S2 is referred to as a second lateral surface external electrode 27*b*.

Layer Structure of External Electrodes

The layer structure of the external electrodes 20 is described based on FIGS. 4 and 5. The external electrodes 20 preferably include three layers: a base electrode layer 21, an inner plated layer 23, and a surface plated layer 24. These layers are provided in order of: the base electrode layer 21, the inner plated layer 23, and the surface plated layer 24, from the end surfaces E of the multilayer body 2. Specifically, the first external electrode 20*a* includes the first base electrode layer 21*a*, the first inner plated layer 23*a*, and the first surface plated layer 24*a*. Similarly, the second external electrode 20*b* includes the second base electrode layer 21*b*, the second inner plated layer 23*b*, and the second surface plated layer 24*b*.

Base Electrode Layer

The first base electrode layer 21*a* is provided on the first end surface E1 of multilayer body 2, covering the first end surface E1. The first base electrode layer 21*a* may extend from the first end surface E1 to portion of the first main surface M1, portion of the second main surface M2, portion of the first lateral surface S1, and portion of the second lateral surface S2.

Similarly, the second base electrode layer 21*b* is provided on the second end surface E2 of multilayer body 2, covering the second end surface E2. The second base electrode layer 21*b* may extend from the second end surface E2 to portion of the first main surface M1, portion of the second main surface M2, portion of the first lateral surface S1, and portion of the second lateral surface S2.

The first base electrode layer 21*a* and the second base electrode layer 21*b* may include at least one selected from: a fired layer, an electrically conductive resin layer, a thin film layer, and a direct plated layer.

Fired Layer

The fired layer contains a glass component and metal. The glass component may preferably include at least one selected from, for example, B, Si, Ba, Mg, Al, Li, etc. The metal may include at least one selected from, for example, Cu, Ni, Ag, Pd, Ag—Pd alloy, Au, etc. The fired layer may include a plurality of layers. The fired layer is formed by applying electrically conductive paste including the glass component and metal on the multilayer body 2, followed by firing. This firing process may be performed simultaneously with firing the internal electrode layers 10, or separately after firing the internal electrode layers 10.

The thickness of the first fired layer and the second fired layer at the central portion of the first base electrode layer 21*a* on the first end surface E1 and the second base electrode layer 21*b* on the second end surface E2 in the lamination direction T is, for example, preferably between about 0.1 μm and about 200 μm inclusive.

When a fired layer is provided on the first main surface M1 and the second main surface M2, as well as on the first lateral surface S1 and the second lateral surface S2, the thickness of the fired layer at the central portion of the base electrode layer 21 on each surface in the length direction is, for example, preferably between about 0.1 μm and about 200 μm inclusive.

Conductive Resin Layer

Next, a case will be described where the first base electrode layer 21*a* and the second base electrode layer 21*b* include an electrically conductive resin layer.

The electrically conductive resin layer preferably includes a thermosetting resin and metal. The electrically conductive resin layer includes a thermosetting resin. Therefore, the electrically conductive resin layer is more flexible than conductive layers formed from plating films or fired electrically conductive paste. Thus, the electrically conductive resin layer can serve as a cushioning layer in ceramic electronic components such as the multilayer ceramic capacitors 1, even when subjected to physical impact or shock due to thermal cycling, thus preventing cracks in the capacitor.

The metal included in the electrically conductive resin layer can be, for example, Ag, Cu, or their alloys. Metal powders coated with, for example, Ag on the surface can be used as the metal. When metal powders coated with Ag are used, Cu or Ni is preferably used as the metal powder. Metals such as Cu subjected to antioxidant treatment can also be used. The electrically conductive metal power of Ag is used as the electrically conductive metal, since Ag has the lowest specific resistance among metals, making it suitable for electrode material, and Ag is a noble metal, and thus exhibits high resistance to oxidation. The metals coated with Ag are used, since the properties of Ag can be utilized while reducing the amount of Ag used, allowing the base metals to be less expensive.

The metal content is, for example, preferably between about 35 vol % and about 75 vol % inclusive of the total volume of the electrically conductive resin. The shape of the metal included in the electrically conductive resin layer is not particularly limited. The shape of the metal, or electrically conductive filler, may be spherical or flake-shaped, among others. The average particle size of the metal in the electrically conductive resin layer is not particularly limited. For instance, the average particle size of the metal, such as the electrically conductive filler, can be, for example, approximately between about 0.3 μm and about 10 μm inclusive.

The metals included in the electrically conductive resin layer primarily contribute to the conductivity of the electrically conductive resin layer. Specifically, contact between the electrically conductive fillers forms electrical conduction paths within the electrically conductive resin layer. While spherical or flake-shaped metals can be used, a mixture of spherical and flake-shaped metal powders is preferably used.

Resins used in the electrically conductive resin layer can include various known thermosetting resins such as, for example, epoxy resin, phenol resin, urethane resin, silicone resin, and polyimide resin. Among these, epoxy resin, known for its heat resistance, moisture resistance, and adhesiveness, is one of the most suitable resins. The resin included in the electrically conductive resin layer is, for example, preferably between about 25 vol % and about 65 vol % inclusive of the total volume of the electrically conductive resin. Furthermore, the electrically conductive resin layer preferably includes, for example, a curing agent along with the thermosetting resin. As a curing agent, for example, when epoxy resin is used as the base resin, various known compounds such as phenolic, amine, anhydride, and imidazole types can be used as curing agents for the epoxy resin.

The electrically conductive resin layer may be provided on the fired layer so as to cover the fired layer, or may be directly provided on the multilayer body 2. The electrically conductive resin layer may be a plurality of layers.

The thickness of the first conductive resin layer and the second conductive resin layer at the central portion of the first base electrode layer 21*a* on the first end surface E1 and the second base electrode layer 21*b* on the second end surface E2 in the lamination direction for T is, example, preferably approximately between about 10 μm and about 200 μm inclusive.

When providing an electrically conductive resin layer on the first main surface M1 and the second main surface M2, as well as on the first lateral surface S1 and the second lateral surface S2, the thickness of the electrically conductive resin layer at the central portion of the base electrode layer 21 on each surface in the length direction is, for example, preferably approximately between about 5 μm and about 50 μm inclusive.

Thin Film Layer

Next, in cases where the first base electrode layer 21*a* and the second base electrode layer 21*b* include a thin film layer, the thin film layer can be formed by thin film formation methods such as sputtering or vapor deposition, resulting, for example, in a layer of metal particles deposited to a thickness of about 1 μm or less.

Direct Plated Layer

The external electrodes 20 can include a direct plated layer. The direct plated layer is a plated layer formed directly on the surface of the multilayer body 2.

That is, the multilayer ceramic capacitor 1 may incorporate a structure that includes a direct plated layer electrically connected to either the first internal electrode layer 10*a* or the second internal electrode layer 10*b*. When forming the direct plated layer, a catalyst may be applied to the surface of the multilayer body 2 as a pretreatment before the direct plated layer is formed.

The direct plated layer preferably includes, for example, at least one metal selected from Cu, Ni, Sn, Pb, Au, Ag, Pd, Bi, or Zn, or an alloy including such metal. For example, when the first internal electrode layer 10*a* and the second internal electrode layer 10*b* are formed using Ni, the direct plated layer is preferably formed using Cu, which has good bonding properties with Ni. The thickness per layer of the direct plated layer is, for example, preferably between about 1.0 μm and about 15 μm inclusive. The plated layer preferably does not include glass. The metal ratio per unit volume of the plated layer is, for example, preferably about 99 vol % or more.

The plated layer on top of the base electrode layer 21 may be either a single layer or a plurality of layers. When the plated layer includes two layers, the preferable order of the layers is, for example, a Ni plated layer and a Sn plated layer from the bottom up. When the plated layer includes three layers, for example, the preferable order of the layers is a Sn plated layer, a Ni plated layer, and another Sn plated layer from the bottom up. Among these, a two-layer structure consisting of Ni plating and Sn plating is preferable. The following describes the case where the plated layers include the inner plated layer 23 and the surface plated layer 24.

Inner Plated Layer

The inner plated layer 23 is provided on top of the base electrode layer 21, covering at least portion of the base electrode layer 21.

Surface Plated Layer

The surface plated layer 24 is provided on top of the inner plated layer 23, covering at least portion of the inner plated layer 23.

The plated layers, including the inner plated layer 23 and the surface plated layer 24, preferably contain at least one selected from metals such as, for example, Cu, Ni, Ag, Pd, Au, and Sn, and alloys such as, for example, Ag—Pd alloy. Among these, the inner plated layer 23 is preferably a Ni plated layer, and the surface plated layer 24 is preferably a Sn plated layer. The Ni plated layer can prevent the base electrode layer from being eroded by solder when mounting the ceramic electronic component. The Sn plated layer can improve solder wettability when mounting the ceramic electronic components, making the mounting process easier. Using a Sn plated layer for the surface plated layer 24 can improve the solder wettability to the external electrodes 20. The thickness per layer of the plated layer is, for example, preferably between about 1.0 μm and about 15 μm inclusive.

Internal Structure (WT Cross-Section) of Multilayer Body

Based on FIG. 5, the internal structure of the multilayer body 2, particularly the internal structure from the second end surface E2, is described. FIG. 5 is a cross-sectional view along the line II-II of the multilayer ceramic capacitor illustrated in FIG. 1. The multilayer body 2 includes an electrode counter portion WF, in which the internal electrode layers 10 oppose each other, and the side gap portions SG, in the width direction W. The side gap portions SG include a first side gap portion SG1 and a second side gap portion SG2. The first side gap portion SG1 and the second side gap portion SG2 are provided to sandwich the electrode counter portion WF. The first side gap portion SG1 is provided between the electrode counter portion WF and the first lateral surface S1, and the second side gap portion SG2 is provided between the electrode counter portion WF and the second lateral surface S2.

Specifically, the first side gap portion SG1 is provided between the end of the internal electrode layer 10 on the first lateral surface S1 side and the first lateral surface S1, and the second side gap portion SG2 is provided between the end of the internal electrode layer 10 on the second lateral surface S2 side and the second lateral surface S2. The first side gap portion SG1 and the second side gap portion SG2 do not include the internal electrode layers 10 and include only the dielectric layers 4. The first side gap portion SG1 and the second side gap portion SG2 function as the protective layers for the internal electrode layers 10. The side gap portions SG are segments in the width direction W, and thus also referred to as W gaps.

The length of the side gap portions SG in the width direction W can be, for example, between about 5 μm and about 50 μm inclusive.

Size of Multilayer Ceramic Capacitor

The size of the multilayer ceramic capacitor 1 is not particularly limited. The size of the multilayer ceramic capacitor 1 can be as follows. The dimension of the multilayer ceramic capacitor 1 including the multilayer body 2 and the external electrodes 20 in the length direction L is referred to as the L dimension. The L dimension is preferably between about 0.2 mm and about 6.5 mm, for example. The dimension of the multilayer ceramic capacitor 1 including the multilayer body 2 and the external electrodes 20 in the lamination direction T is referred to as the T dimension. The T dimension is preferably between about 0.1 mm and about 6.5 mm, for example. The dimension of the multilayer ceramic capacitor 1 including the multilayer body 2 and the external electrodes 20 in the width direction W is referred to as the W dimension. The W dimension is preferably between about 0.1 mm and about 5.5 mm, for example. The lengths of various portions of the multilayer body 2 and the external electrodes 20 can be measured with a micrometer or an optical microscope.

In the present example embodiment, the multilayer ceramic capacitor 1 is, for example, a two-terminal capacitor.

Corner Portions

Figure 6A:
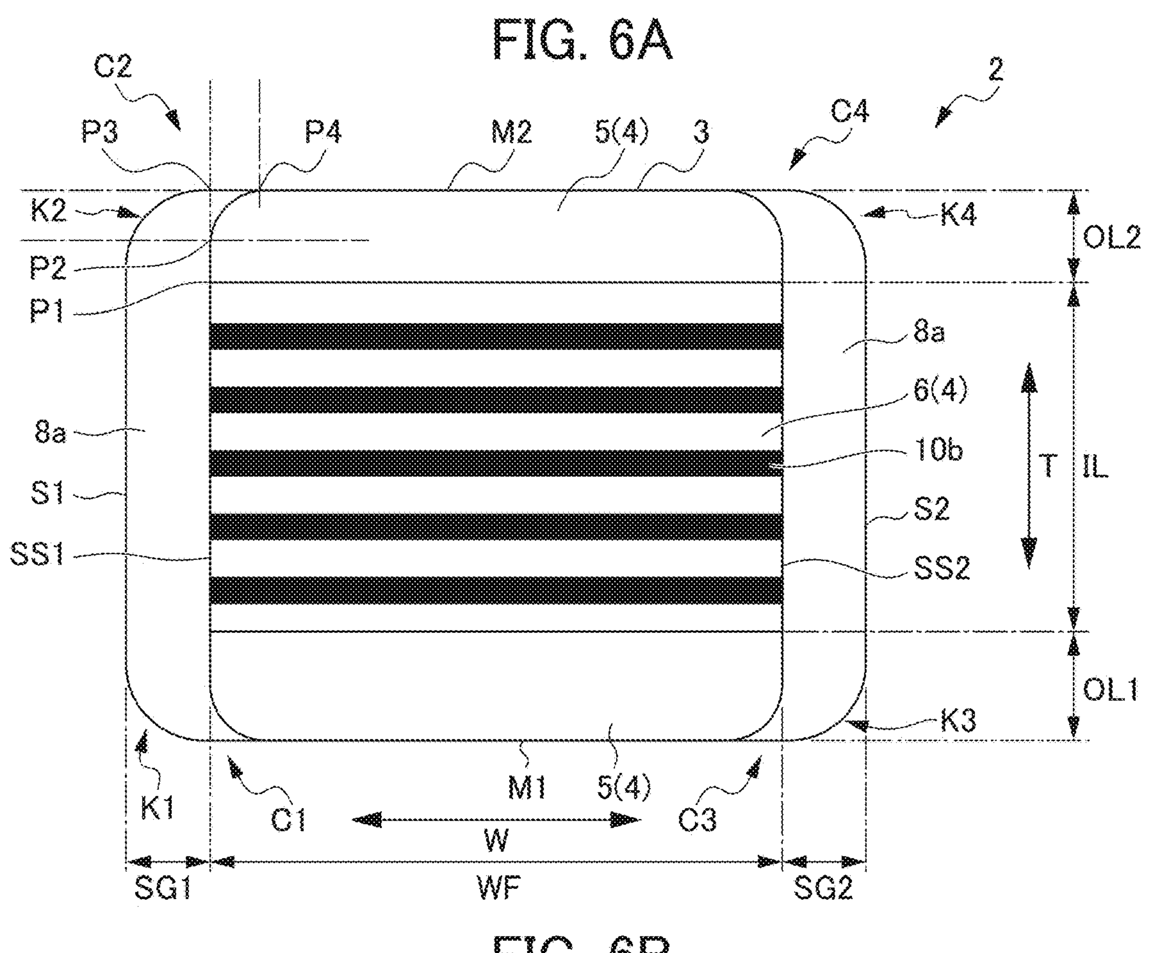
FIG. 6A illustrates a cross-sectional view along the line III-III in FIG. 2.
Figure 6B:
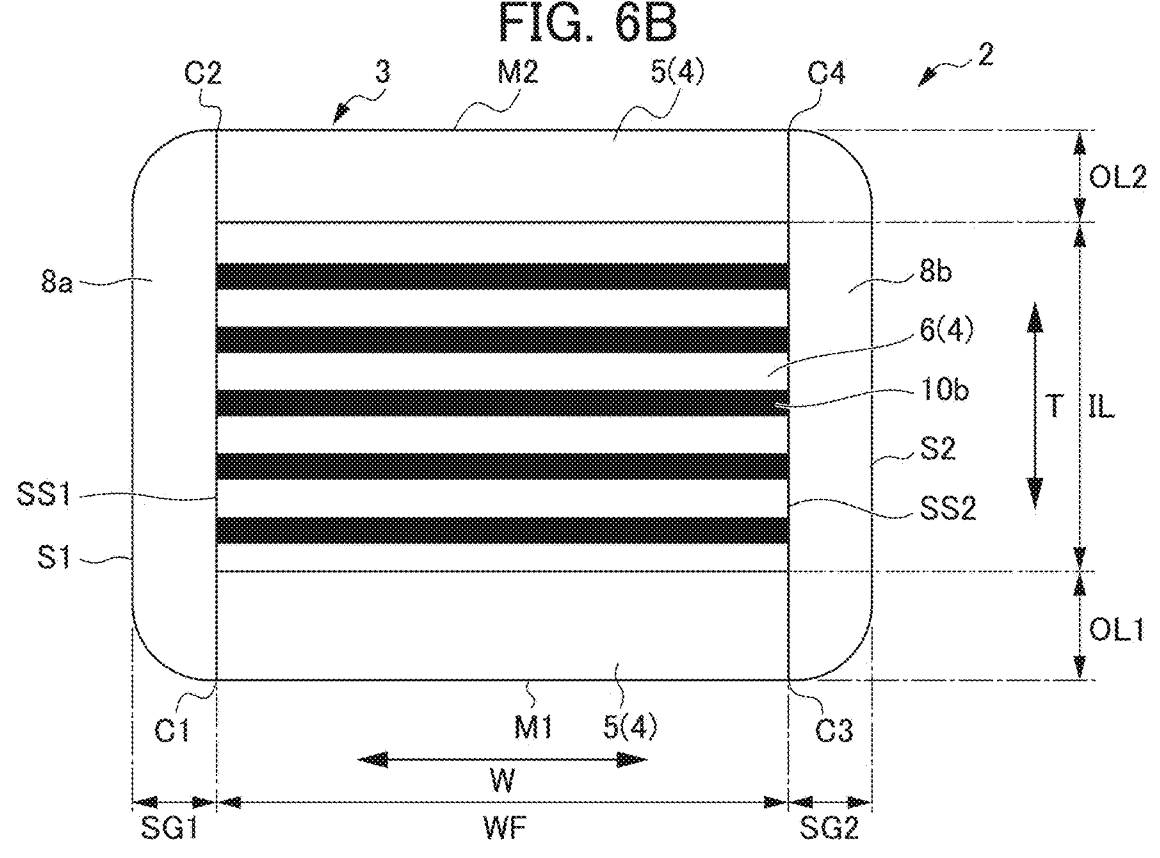
FIG. 6B is a diagram corresponding to the cross-sectional view along the line III-III in FIG. 2 for a conventional multilayer ceramic capacitor.
Figure 7:
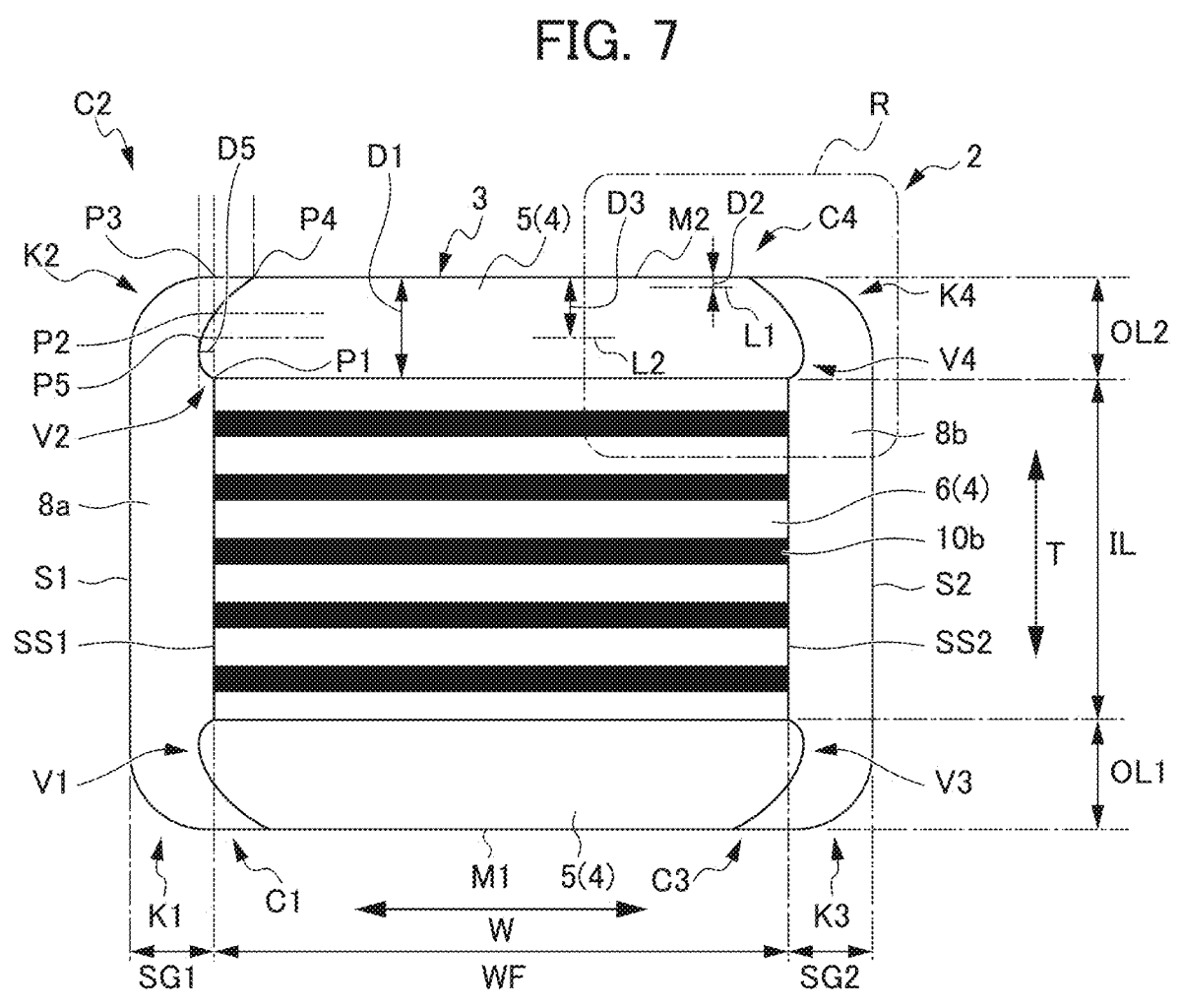

The multilayer ceramic capacitor 1 of the present example embodiment is characterized in the corner portions of the capacitor main portion 3. This is described based on FIGS. 6 and 7. FIG. 6A illustrates a cross-sectional view along the line III-III in FIG. 2, and FIG. 6B is a diagram corresponding to the cross-sectional view along the line III-III in FIG. 2 for a conventional multilayer ceramic capacitor. FIG. 7 is a diagram corresponding to the cross-sectional view along the line III-III in FIG. 2, in another example embodiment of the present invention.

In the present example embodiment of the multilayer ceramic capacitor 1, the corner portions C are curved, where the main surface M and the main portion lateral surface SS intersect, in the capacitor main portion 3. The insulating portions 8 cover the corner portions C.

Definition of Corner Portions

In the capacitor main portion 3, the corner portion where the first main surface M1 and the first main portion lateral surface SS1 intersect is defined as a corner portion C1, and the corner portion where the second main surface M2 and the first main portion lateral surface SS1 intersect is defined as a corner portion C2. Similarly, in the capacitor main portion 3, the corner portion where the first main surface M1 and the second main portion lateral surface SS2 intersect is defined as a corner portion C3, and the corner portion where the second main surface M2 and the second main portion lateral surface SS2 intersect is defined as a corner portion C4.

Curvature of Corner Portions

In the present example embodiment of the multilayer ceramic capacitor 1, the corner portions C are curved. As illustrated in FIG. 6B, in the conventional multilayer ceramic capacitors 1, the corner portions C are bent at nearly right angles as viewed in the length direction L of the capacitor main portion 3, in other words, in the WT cross-section. In contrast, in the present example embodiment of the multilayer ceramic capacitor 1, the corner portions C are curved, as illustrated in FIG. 6A. Specifically, the corner portion C1 is curved across the first main surface M1 and the first main portion lateral surface SS1. The same applies to the other corner portions C. The corner portion C2 is curved across the second main surface M2 and the first main portion lateral surface SS1. The corner portion C3 is curved across the first main surface M1 and the second main portion lateral surface SS2. The corner portion C4 is curved across the second main surface M2 and the second main portion lateral surface SS2.

Covering with Insulating Portions

The insulating portions 8 cover the curved corner portions C. That is, as illustrated in FIG. 6A, the insulating portions 8 cover the corner portions C as viewed in the length direction L of the capacitor main portion 3, in other words, in the WT cross-section.

The second corner portion C2 is described as an example. The outer edge of the second corner portion C2 does not pass through the point P3, which is the intersection point where the second main surface M2 and the first main portion lateral surface SS1 intersect. This is because the second corner portion C2 is curved due to the absence of the outer dielectric layer 5 near the point P3.

The point P2 is defined as a point closer to the first main surface M1 than the point P3 on the first main portion lateral surface SS1. The point P4 is defined as a point closer to the second main portion lateral surface SS2 than the point P3 on the second main surface M2. The second corner portion C2 is curved in a form that connects the points P2 and P4 with a curve line.

The first insulating portion 8*a* is also provided in the portion enclosed by the points P2, P3, and P4. Thus, the second corner portion C2 is covered by the first insulating portion 8*a* from the point P2 to the point P4.

The same applies to corner portions other than the first corner portion C1, namely the second corner portion C2, the third corner portion C3, and the fourth corner portion C4. As described, the first insulating portion 8*a* covers the first corner portion C1 and the second corner portion C2, and the second insulating portion 8*b* covers the third corner portion C3 and the fourth corner portion C4.

Continuous Covering

The insulating portions 8 preferably continuously cover the corner portions C of the capacitor main portion 3 as viewed in the length direction L. Specifically, the insulating portions 8 continuously cover the corner portions C, starting from the edge point on the main portion lateral surface SS. The second corner portion C2 is described as an example. As illustrated in FIG. 6A, for the second corner portion C2, the first insulating portion 8*a* continuously covers the second corner portion C2 from the point P2 to the point P4 without detaching from the capacitor main portion 3.

Here, the point P2 is the edge point on the first main portion lateral surface SS1 at the second corner portion C2. Therefore, it is safe to say that the first insulating portion 8*a* continuously covers the second corner portion C2 from the first main portion lateral surface SS1 when the multilayer body 2 is viewed in the length direction L. The same applies to the corner portions C other than the second corner portion C2.

As such, when the capacitor main portion 3 is viewed in the length direction L, the first insulating portion 8*a* continuously covers the first corner portion C1 and the second corner portion C2; and similarly, the second insulating portion 8*b* continuously covers the third corner portion C3 and the fourth corner portion C4.

Coverage Rate

When the capacitor main portion 3 is viewed in the length direction L, the insulating portions 8 preferably cover, for example, about 50% or more of the corner portions C, from the edge point on the main portion lateral surface SS of the corner portions C, following the shape of the corner portions C. The second corner portion C2 is described as an example. As illustrated in FIG. 6A, for the second corner portion C2, the first insulating portion 8*a* continuously covers the second corner portion C2 from the point P2 to the point P4 without detaching from the capacitor main portion 3. The point P2 is the edge point on the first main portion lateral surface SS1 at the second corner portion C2. Therefore, when the multilayer body 2 is viewed in the length direction L, the first insulating portion 8*a* covers about 50% or more of the second corner portion C2, from the point P2 as the edge point on the first main portion lateral surface SS1, following the shape of the second corner portion C2. The same applies to the corner portions C other than the second corner portion C2.

As such, when the capacitor main portion 3 is viewed in the length direction L, the first insulating portion 8*a* covers, for example, about 50% or more of the first corner portion C1 and the second corner portion C2, from the edge point on the first main portion lateral surface SS1 at the first corner portion C1 and the second corner portion C2, following the shape of the first corner portion C1 and the second corner portion C2; and similarly, the second insulating portion 8*b* covers, for example, about 50% or more of the third corner portion C3 and the fourth corner portion C4, from the edge point on the second main portion lateral surface SS2 at the third corner portion C3 and the fourth corner portion C4, following the shape of the third corner portion C3 and the fourth corner portion C4.

Surface Roughness

Next, the roughness of the corner portions C is described. In the present example embodiment of the multilayer ceramic capacitor 1, the roughness of the corner portions C is greater than the roughness of the insulating portions 8 provided over the corner portions C. In other words, the roughness of the corner portions C is greater than the roughness of the corner portions of the multilayer body 2 corresponding to the corner portions C. A description thereof follows.

Outer Corner Portions

In the first insulating portion 8*a*, the corner portion where the first main surface M1 and the first lateral surface S1 intersect is referred to as a first outer corner portion K1. In the first insulating portion 8*a*, the corner portion where the second main surface M2 and the first lateral surface S1 intersect is referred to as a second outer corner portion K2. Similarly, in the second insulating portion 8*b*, the corner portion where the first main surface M1 and the second lateral surface S2 intersect is referred to as a third outer corner portion K3. In the second insulating portion 8*b*, the corner portion where the second main surface M2 and the second lateral surface S2 intersect is referred to as a fourth outer corner portion K4. As previously described, the first lateral surface S1 is the surface opposing the surface in contact with the first main portion lateral surface SS1 in the first insulating portion 8*a*. The second lateral surface S2 is the surface opposing the surface in contact with the second main portion lateral surface SS2 in the second insulating portion 8*b*.

In the multilayer ceramic capacitor 1 according to the present example embodiment of, the roughness of the first corner portion C1 is greater than the roughness of the first outer corner portion K1. Similarly, the roughness of the second corner portion C2 is greater than the roughness of the second outer corner portion K2, the roughness of the third corner portion C3 is greater than the roughness of the third outer corner portion K3, and the roughness of the fourth corner portion C4 is greater than the roughness of the fourth outer corner portion K4.

By increasing the roughness of the corner portions C in this manner, the adhesion between the capacitor main portion 3 and the insulating portions 8 can be enhanced through the anchor effect created by the surface shape of the corner portions C. This can prevent or mitigate the occurrence of delamination.

The roughness of the corner portions C is, for example, preferably between about 0.05 μm or more and less than about 1.00 μm. If the roughness is less than about 0.05 μm, the anchor effect is likely to be insufficient. If the roughness is about 1.00 μm or more, the surface irregularities may become too large, potentially preventing adequate adhesion between the capacitor main portion 3 and the insulating portions 8, leading to air entrapment or delamination.

Method of Measuring Surface Roughness

Surface roughness can be measured as follows. The ½ WT cross-section of the multilayer body 2 is observed by SEM. The image is then binarized between the multilayer body 2 and the insulating portion 8, and the roughness of the corner portions C of the capacitor main portion 3, as well as the roughness of the outer corner portions K of the multilayer body 2, is measured. The outer corner portions K of the multilayer body 2 and the outer corner portions K of the insulating portion 8 refer to the same meaning and the same position. More specifically, based on the contour lines of the corner portions C of the capacitor main portion 3 and the contour lines of the outer corner portions K of multilayer body 2, roughness was measured using a Keyence digital microscope and image analysis software. The roughness measured with the image analysis software is the surface roughness Sa, which conforms to the ISO-25178 standard.

Other Shapes of Corner Portions

The discussion now turns to other shapes of the corner portions C. FIG. 7 is a diagram corresponding to the cross-sectional view along the line III-III in FIG. 2, in another example embodiment of the present invention. In this other example embodiment illustrated in FIG. 7, the corner portions C include protrusions V extending in the width direction W. Specifically, as illustrated in FIG. 7, within the first outer layer portion OL1, the corner portion C1 includes a first protrusion V1 protruding in a direction toward the first insulating portion 8*a*, and the corner portion C3 includes a third protrusion V3 protruding in a direction toward the second insulating portion 8*b*. Similarly, within the second outer layer portion OL2, the corner portion C2 includes a second protrusion V2 protruding in a direction toward the first insulating portion 8*a*, and the corner portion C4 includes a fourth protrusion V4 protruding in a direction toward the second insulating portion 8*b*.

The second corner portion C2 is described as an example. In FIG. 7, in the second protrusion V2 at the second corner portion C2, the vertex in a direction toward the first insulating portion 8*a* of the second protrusion V2 is indicated by the point P5. As illustrated in FIG. 7, the point P5 as the vertex of the second protrusion V2 protrudes from the first main portion lateral surface SS1 of the capacitor main portion 3 in a direction toward the first lateral surface S1 of the multilayer body 2. The length D5, by which the point P5 as the vertex of the second protrusion V2 protrudes from the first main portion lateral surface SS1 of the capacitor main portion 3 in a direction toward the first lateral surface S1 of the multilayer body 2, can be set, for example, between about 0.5 μm and about 10.0 μm inclusive.

Next, the position of the protrusion V in the lamination direction T is described. In FIG. 7, D1 indicates the thickness of the second outer layer portion OL2 in the lamination direction T. In FIG. 7, the line L1 in the second outer layer portion OL2 indicates the 10% position in the thickness of the second outer layer portion OL2 in the lamination direction T from the second main surface M2. More specifically, D1:D2=100:10. In FIG. 7, the line L2 in the second outer layer portion OL2 indicates the 60% position in the thickness of the second outer layer portion OL2 in the lamination direction T from the second main surface M2. More specifically, D1:D3=100:60.

As illustrated in FIG. 7, the point P5 as the vertex of the second protrusion V2 is located within the range from the line L1 to the line L2 of the second outer layer portion OL2 in the lamination direction T. That is, the point P5 as the vertex of the second protrusion V2 is located at a position within the range between about 10% and about 60% inclusive of the thickness of the second outer layer portion OL2 in the lamination direction T from the second main surface M2. Such a location of the second protrusion V2 also applies to the protrusions V other than the second protrusion V2. Thus, for example, the protrusions V are located within the range between about 10% and about 60% inclusive of the thickness of the outer layer portion OL of the multilayer body 2 in the lamination direction T from either of the first main surface M1 or the second main surface M2. The position of the protrusion V is defined by the position of the vertex of the protrusion V in the width direction W.

Other Shapes of Protrusions

Figure 8:
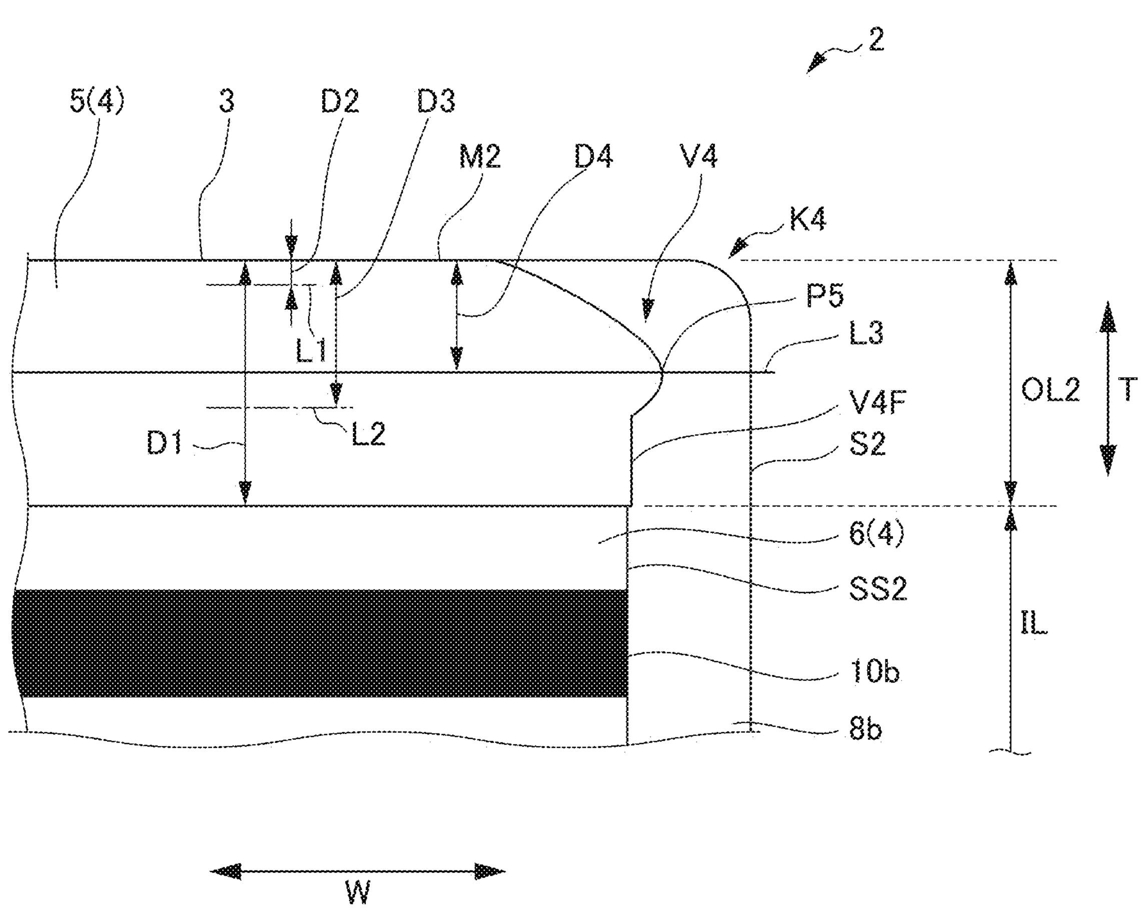
FIG. 8 is a diagram illustrating a region R of FIG. 7, in another example embodiment of the present invention.

Various modifications can be made to the shape of protrusion V. An example is described based on FIG. 8. FIG. 8 illustrates another form of protrusion V. FIG. 8 is a diagram illustrating the region R of FIG. 7. As for the protrusion V4 illustrated in FIG. 7, the protrusion V4 extends over the entire area of the outer dielectric layer 5 in the lamination direction T. In other words, the edge surface of the outer dielectric layer 5 does not include a straight-line portion parallel to the second main portion lateral surface SS2. In contrast, as for the protrusion V4 illustrated in FIG. 8, a flat portion V4F is provided between the protrusion V4 and the inner layer portion IL in the lamination direction T. This flat portion V4F is a straight-line portion parallel to the second main portion lateral surface SS2, on the edge surface of the outer dielectric layer 5.

As for the protrusion V4 illustrated in FIG. 8, at the second main portion lateral surface SS2, the boundary between the second outer layer portion OL2 and the inner layer portion IL can facilitate improved adhesion between the capacitor main portion 3 and the second insulating portion 8*b*. This helps further prevent delamination or moisture infiltration between the second outer layer portion OL2 and the inner layer portion IL.

Shape of Protrusions in Length Direction

Figure 9:
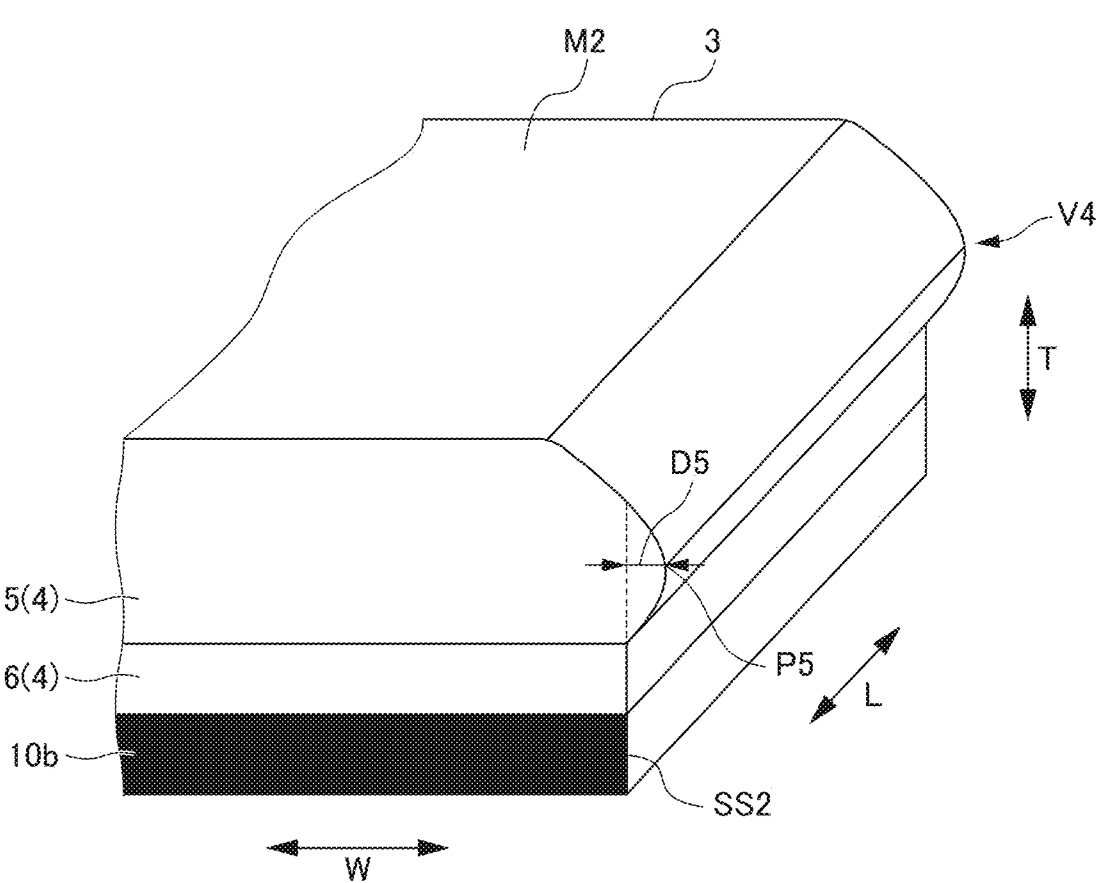
FIG. 9 is a perspective view illustrating portion of the capacitor main portion according to an example embodiment of the present invention.
Figure 10:
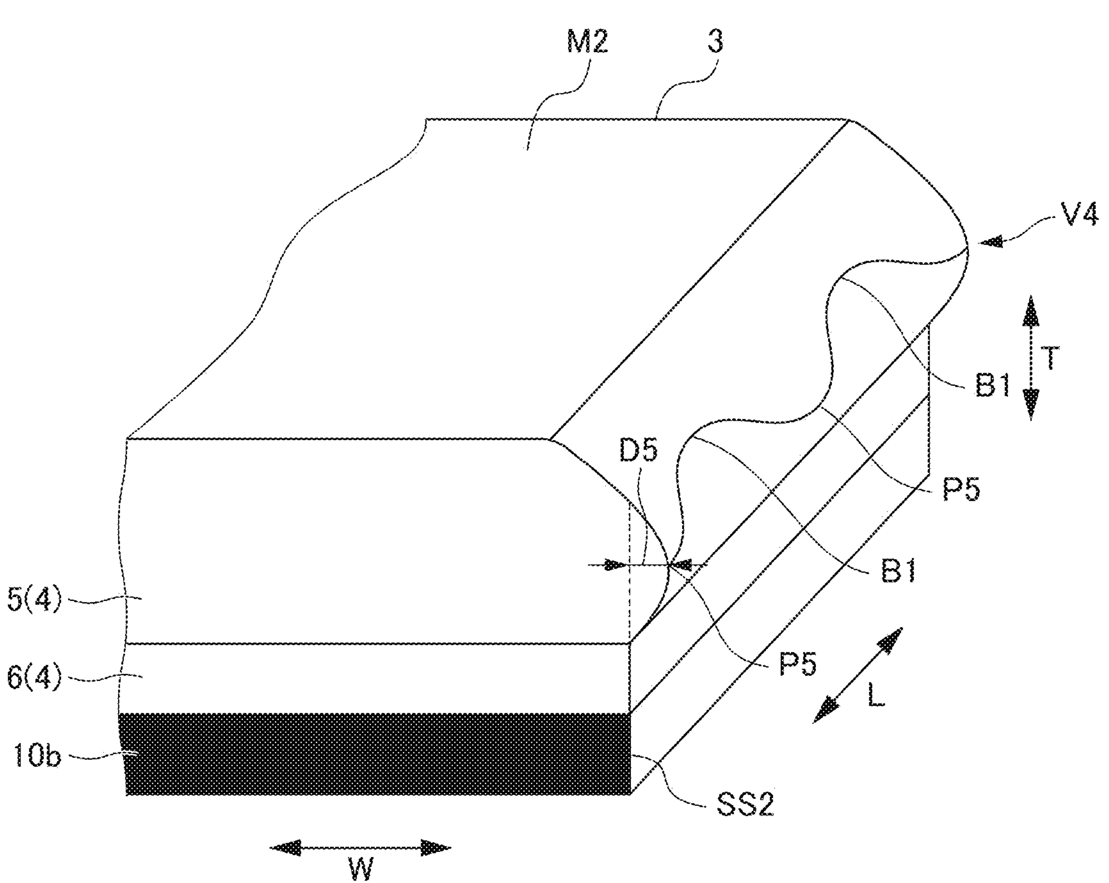
FIG. 10 is a perspective view illustrating portion of the capacitor main portion according to another example embodiment of the present invention.

Next, the shape of the protrusions V in the length direction L is described based on FIGS. 9 and 10. FIG. 9 is a perspective view illustrating portion of the capacitor main portion 3. FIG. 10 is a perspective view illustrating portion of another form of the capacitor main portion 3. Specifically, FIGS. 9 and 10 are partial perspective views of the capacitor main portion 3 included in the region R of FIG. 7, illustrating portion of the length of the capacitor main portion 3 in the length direction L. The protrusion V illustrated in FIG. 9 and the protrusion V illustrated in FIG. 10 differ in the value of D5, which is the height of the protrusion V in the length direction L.

The protrusion V illustrated in FIG. 9 has a constant height D5 in the length direction L. That is, the protrusion V is continuously formed in the length direction L.

However, the protrusion V does not need to be continuously formed in the length direction L as illustrated in FIG. 9. The height D5 of the protrusion V can vary in the length direction L, forming a shape with a plurality of peaks. In other words, the protrusion V can be made non-uniform or discontinuous in the length direction L. In a discontinuous form, the peaks may be spaced at regular intervals or irregular intervals.

FIG. 10 illustrates an example of the form with a plurality of peaks. The point P5 in FIG. 10 indicates the point where D5 reaches a maximum in the length direction L. That is, the point P5 represents the position of the peak of mountain. Conversely, the point B1 in FIG. 10 indicates the point where D5 reaches a minimum in the length direction L. That is, the point B1 represents the position of the valley between mountains. As illustrated in FIG. 10, the protrusion V can be formed such that the points P5 and B1 repeat a plurality of times in the length direction L. This allows for realizing a protrusion V with a plurality of peaks in the length direction L.

The protrusion V does not contact either the first internal electrode layer 10*a* or the second internal electrode layer 10*b*. The second protrusion V2 is described as an example. In FIG. 7, the point P1 indicates the boundary between the first outer layer portion OL1 and the inner layer portion IL on the first main portion lateral surface SS1. As illustrated in FIG. 7, the second protrusion V2 does not extend beyond the point P1 into the range of the inner layer portion IL. Therefore, the second protrusion V2 does not contact either the first internal electrode layer 10*a* or the second internal electrode layer 10*b*. This also applies to the protrusions V other than the second protrusion V2. Thus, the protrusion V does not contact either the first internal electrode layer 10*a* or the second internal electrode layer 10*b*. In other words, the protrusion V is not joined to the internal electrode layer 10.

The protrusion V can be a projection different from the projections created by the surface roughness of the corner portion C. That is, the protrusion V can be made as a protrusion discontinuous from the surface irregularities of the corner portion C. Alternatively, the protrusion V can be a protrusion continuous with the surface irregularities of the corner portion C. In other words, the protrusion V can be a projection extending from the corner portion C. The width of projection of the protrusion V is preferably wider than the width of the protrusions related to the roughness of corner portion C. Here, the width of the projection and protrusion refers to the width in the WT cross-section.

The material forming the protrusion V preferably includes the same main components as the dielectric layer 4.

By such an arrangement of the protrusions V as described above, when moisture infiltrates from the interface between the multilayer body 2 and the insulating portion 8, the protrusion V can prevent the moisture from infiltrating into the effective portions.

Insulating Portion

Hereinafter, the insulating portion is described. The thickness of the insulating portion 8 is, for example, preferably between about 10 μm and about 50 μm inclusive. The insulating portion 8 with the thickness of less than about 10 μm cannot sufficiently cover the interface exposed at the main portion lateral surface SS of the capacitor main portion 3. This may potentially lead to decreased moisture resistance reliability. On the other hand, if the thickness of the insulating portion 8 exceeds 50 μm, the dimensions of the multilayer body 2 may become excessively large. This reduces the flexibility of mounting the multilayer ceramic capacitor 1.

The insulating portion 8 may be a single layer or two layers. If the insulating portion 8 includes two layers, the total thickness of the two layers may be, for example, between about 10 μm and about 50 μm inclusive, or the thickness of each layer may be, for example, between about 10 μm and about 50 μm inclusive. The insulating portion 8 including two layers can further improve moisture resistance.

In the foregoing description, the first to fourth corner portions C have been described uniformly. However, the first to fourth corner portions C do not necessarily have to be uniform and, for example, the shapes described above can differ for each corner portion C.

Manufacturing Method for Multilayer Ceramic Electronic Components

Next, an example of a manufacturing method for the multilayer ceramic electronic components will be described, taking the multilayer ceramic capacitor 1 as an example. The following description will focus on characteristic points in the manufacturing method for the multilayer ceramic capacitor 1 of the present example embodiment.

Preparation of Multilayer Block

Dielectric sheets, and electrically conductive paste for the internal electrode layers are prepared. The dielectric sheets and electrically conductive paste for the internal electrode layers include a binder and solvent. Known organic binders and organic solvents can be used for the binder and solvent. The electrically conductive paste for the internal electrode layers is printed on the dielectric sheets in a predetermined pattern using, for example, screen printing or gravure printing to form the internal electrode layer pattern. A predetermined number of outer layer dielectric sheets without the printed internal electrode layer pattern are stacked, the dielectric sheets with the printed internal electrode layer pattern are sequentially stacked, then a predetermined number of another of the outer layer dielectric sheets are stacked to create a multilayer sheet. The multilayer sheet is pressed in the lamination direction using means such as a hydrostatic press to create a multilayer block.

Preparation of Multilayer Chips

The multilayer block is cut into a predetermined size to prepare multilayer chips. The multilayer chips become the capacitor main portion 3 upon firing. Hereinafter, the capacitor main portion 3 before firing may be referred to as a precursor to the capacitor main portion. After cutting out the multilayer chips, the corner portions of the multilayer chips are rounded using methods such as barrel polishing. During this process, protrusions are formed around the corner portions by varying the time or rotation speed of the barrel polishing, or both.

Processing of Corner Portions

When rounding the corner portions of the multilayer chip, the surface of the corner portions can be roughened using sandpaper or by sandblasting to ensure the corner portions have the desired roughness. In the case of using sandpaper, using coarser sandpaper can make the surface of the corner portions rougher. The desired roughness can be achieved by adjusting the pressure of the sandpaper. When using sandblasting, the desired roughness can be achieved by controlling the strength or duration of the blasting, or both. The method of roughening the corner portions to achieve the desired roughness of the corner portions is not limited to the aforementioned methods, and various methods can be employed.

When rounding the corner portions of the multilayer chip, for example, protrusions V of the desired shape can be formed by changing the pressure of the sandpaper. The method of forming protrusions V is not limited to this. For example, protrusions V can also be formed by accumulating the material removed.

Formation of Insulating Portion

After processing the corner portions, the insulating portion 8 is formed on each of the two main portion lateral surfaces SS of the precursor to the capacitor main portion 3 having a predetermined shape of corner portions. The insulating portion 8 may be formed by punching out an insulating sheet onto the main portion lateral surface SS or by forming the insulating portion 8 on the main portion lateral surface SS using the dip method.

When forming the insulating portion 8 using a punching method with an insulating sheet, the elastomer used for punching is given a desired hardness, and the pressing amount is adjusted, whereby the insulating portion 8 can be formed to cover from the main portion lateral surface SS to an arbitrary position of the corner portion.

When forming the insulating portion 8 by the dip method, the pressing amount during the dip or the amount of insulating paste is adjusted, or both are adjusted, whereby the insulating portion can be formed into the desired shape.

Next, the multilayer chips are fired to create the multilayer body 2. The firing temperature depends on the materials of the dielectric layer 4 and the internal electrode layer 10, but is preferably between about 900° C. and about 1400° C. inclusive. The insulating portion 8 may be formed after firing the multilayer chip, or the insulating portion 8 may be formed before firing, and then the multilayer chip with the insulating portion 8 may be fired.

Before or after the firing, the outer corner portions K of the multilayer body 2, in other words, the outer corner portions K of the insulating portion 8, are preferably rounded. In this case, the outer corner portions K can also be roughened to a predetermined roughness. The methods of rounding and roughening the surface can use the same methods as those applied to the corner portions of the multilayer chips.

External Electrodes

Next, the formation of the external electrodes 20 is described.

Case where Base Electrode Layer is Fired Layer

First, electrically conductive paste for the base electrode layer 21 is applied to both the end surfaces E of the multilayer body 2 to form the base electrode layer 21. To form a fired layer, electrically conductive paste including glass components and metals, applied by methods such as dipping, is fired to form the base electrode layer 21. The firing temperature for this process is, for example, preferably between about 700° C. and about 900° C. inclusive. Afterwards, plating can be conducted on the surface of the fired layer as needed.

Case of Providing Conductive Resin Layer

When forming the base electrode layer 21 with an electrically conductive resin layer, the electrically conductive resin layer can be formed by the following method. The electrically conductive resin layer may be formed on the surface of the fired layer or formed directly on the multilayer body 2 without forming a fired layer. As a method of forming the electrically conductive resin layer, an electrically conductive resin paste including thermosetting resin and metal components is applied onto the fired layer or the multilayer body 2, followed by thermal treatment at temperatures, for example, between about 250° C. and about 550° C. inclusive to thermally cure the resin to form the electrically conductive resin layer. The atmosphere during thermal treatment is preferably a $N_2$ atmosphere. In order to prevent scattering of the resin and oxidation of various metal components, the oxygen concentration is, for example, preferably kept at about 100 ppm or lower.

Case of Providing Thin Film Layer

When forming the base electrode layer 21 with a thin film layer, the base electrode layer 21 can be formed using thin film formation methods such as sputtering or vapor deposition. The base electrode layer 21 formed with a thin film layer should be a layer of metal particles deposited to a thickness of, for example about 1 μm or less.

Case of Providing Direct Plated layer

A direct plated layer may be provided on the exposed portion of the internal electrode layer 10 of the multilayer body 2. This can be formed as follows. A plating process is conducted on the first end surface E1 and the second end surface E2 of the multilayer body 2, thus forming a direct plated film on the exposed portion of the internal electrode layer 10. Electroplating or electroless plating may be used for the plating treatment. However, electroless plating requires a catalyst or similar pretreatment to increase the plating deposition rate, and thus involves a disadvantage of complicating the process. Therefore, electroplating is usually preferred. Barrel plating is preferable for the plating process. If necessary, upper plating electrodes, usually formed on the surface of the lower plating electrodes, may be similarly formed.

Afterwards, a plated layer is formed on the surface of the base electrode layer, the surface of the electrically conductive resin layer, or the surface of the direct plated layer. In the present example embodiment, a Ni plated layer and a Sn plated layer are formed on the fired layer. The Ni plated layer and Sn plated layer are sequentially formed, for example, with the barrel plating method. A multilayer ceramic capacitor 1 is obtained in this manner.

While example embodiments of the present invention have been described, it should be understood that the present invention is not limited to the above-described example embodiments and that various changes and modifications thereto can be made.

For example, the method of forming the external electrodes 20 is not limited to the previously described method. For instance, Ni may be screen-printed on the two end surfaces E of the multilayer body 2. Subsequently, for example, the two end surfaces E may be dipped in Cu to form a Cu layer on Ni. Thereafter, Ni and Sn plating can be conducted to form the external electrodes 20.

The description above focused on the portions where two surfaces of the multilayer body 2 or the capacitor main portion 3 intersect. However, the curvature and the predetermined roughness of the corner portions are not limited to the corner portions where two surfaces intersect. Alternatively, at the portions where three surfaces of the multilayer body 2 or the capacitor main portion 3 intersect, the corner portions can be curved, the surfaces can be roughened, or both can be performed.

The example embodiments of the present invention have been described above, and it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor, comprising:

a capacitor main portion, including:

a plurality of dielectric layers which are stacked;

a first main surface and a second main surface on opposite sides in a lamination direction;

a first main portion lateral surface and a second main portion lateral surface on opposite sides in a width direction orthogonal or substantially orthogonal to the lamination direction;

a first end surface and a second end surface on opposite sides in a length direction orthogonal or substantially orthogonal to both the lamination direction and the width directions;

a first internal electrode layer, stacked alternately with the plurality of dielectric layers, exposed at the first end surface and the first main portion lateral surface and the second main portion lateral surface; and a second internal electrode layer, stacked alternately with the plurality of dielectric layers, exposed at the second end surface and the first main portion lateral surface and the second main portion lateral surface;

a multilayer body, including:

a first insulating portion on the first main portion lateral surface of the capacitor main portion; and a second insulating portion on the second main portion lateral surface of the capacitor main portion;

a first external electrode wrapping around from the first end surface to the first main surface, the second main surface, the surface of the first insulating portion, and the surface of the second insulating portion; and a second external electrode wrapping around from the second end surface to the first main surface, the second main surface, the surface of the first insulating portion, and the surface of the second insulating portion; wherein the capacitor main portion includes a first corner portion curving across the first main surface and the first main portion lateral surface, a second corner portion curving across the second main surface and the first main portion lateral surface, a third corner portion curving across the first main surface and the second main portion lateral surface, and a fourth corner portion curving across the second main surface and the second main portion lateral surface;

the first insulating portion covers the first corner portion and the second corner portion;

the second insulating portion covers the third and fourth corner portions;

a surface opposing the surface contacting the first main portion lateral surface in the first insulating portion is defined as a first lateral surface of the multilayer body;

a surface opposing the surface contacting the second main portion lateral surface in the second insulating portion is defined as a second lateral surface of the multilayer body;

the first insulating portion includes a first outer corner portion where the first main surface and the first lateral surface intersect, and a second outer corner portion where the second main surface and the first lateral surface intersect;

the second insulating portion includes a third outer corner portion where the first main surface and the second lateral surface intersect, and a fourth outer corner portion where the second main surface and the second lateral surface intersect;

a roughness of the first corner portion is greater than a roughness of the first outer corner portion;

a roughness of the second corner portion is greater than a roughness of the second outer corner portion;

a roughness of the third corner portion is greater than a roughness of the third outer corner portion; and a roughness of the fourth corner portion is greater than a roughness of the fourth outer corner portion.

2. The multilayer ceramic capacitor according to claim 1, wherein the roughness of the first, second, third, and fourth corner portions is between about 0.05 μm and about 1.00 μm inclusive.

3. The multilayer ceramic capacitor according to claim 1, wherein the capacitor main portion further includes:

an inner layer portion provided by alternately stacking the first internal electrode layer, the dielectric layers, and the second internal electrode layer;

a first outer layer portion on the side of the first main surface of the inner layer portion in the lamination direction, the first outer layer portion made of the dielectric layers; and a second outer layer portion on the side of the second main surface of the inner layer portion in the lamination direction, the second outer layer portion made of the dielectric layers; wherein the first outer layer portion includes a first protrusion protruding in a direction toward the first insulating portion and a third protrusion protruding in a direction toward the second insulating portion, located within a range between about 10% and about 60% inclusive of a thickness of the first outer layer portion in the lamination direction from the first main surface; and a second protrusion protruding in a direction toward the first insulating portion and a fourth protrusion protruding in a direction toward the second insulating portion, located within a range between about 10% and about 60% inclusive of a thickness of the second outer layer portion in the lamination direction from the second main surface.

4. The multilayer ceramic capacitor according to claim 3, wherein the first, second, third, and fourth protrusions do not contact either of the first internal electrode layer or the second internal electrode layer.

5. The multilayer ceramic capacitor according to claim 1, wherein a thickness of the first insulating portion and the second insulating portion in the width direction is between about 10.0 μm and about 50.0 μm inclusive.

6. The multilayer ceramic capacitor according to claim 1, wherein, when viewed in the length direction of the capacitor main portion:

the first insulating portion continuously covers the first corner portion and the second corner portion; and the second insulating portion continuously covers the third and fourth corner portions.

7. The multilayer ceramic capacitor according to claim 1, wherein, when viewed in the length direction of the capacitor main portion:

the first insulating portion covers about 50% or more of the first corner portion and the second corner portion, starting from an edge point on the first main portion lateral surface of the first corner portion and the second corner portion, following the shape of the first corner portion and the second corner portion; and the second insulating portion covers about 50% or more of the third and fourth corner portions, starting from an edge point on the second main portion lateral surface of the third and fourth corner portions, following the shape of the third and fourth corner portions.

8. The multilayer ceramic capacitor according to claim 1, wherein both of the first insulating portion and the second insulating portion have a sheet shape.

9. The multilayer ceramic capacitor according to claim 3, wherein the inner layer portion generates a capacitance and defines and functions as a capacitor.

10. The multilayer ceramic capacitor according to claim 1, wherein the dielectric layers include a plurality of crystal grains including perovskite compounds based on BaTiO3 as the basic structure.

11. The multilayer ceramic capacitor according to claim 1, wherein a thickness of the first internal electrode layer and the second internal electrode layer is between about 0.1 μm and about 5.0 μm inclusive.

12. The multilayer ceramic capacitor according to claim 3, further comprising a dummy electrode layer provided in at least one of the inner layer portion and the outer layer portion.

13. The multilayer ceramic capacitor according to claim 1, wherein the first external electrode and the second external electrode include a base electrode layer, an inner plated layer, and a surface plated layer.

* * * * *